US012508272B2

(12) United States Patent
Weinstein et al.

(10) Patent No.: US 12,508,272 B2
(45) Date of Patent: Dec. 30, 2025

(54) LONG-ACTING LIPOSOMAL COMPOSITION FOR TREATMENT OF PAIN IN ARTICULAR DISORDERS

(71) Applicant: MOEBIUS MEDICAL LTD., Tel Aviv (IL)

(72) Inventors: Moshe Weinstein, Tel Mond (IL); Ron Pinkus, Raanana (IL)

(73) Assignee: MOEBIUS MEDICAL LTD., Tel Aviv (IL)

( * ) Notice: Subject to any disclaimer, the term of this patent is extended or adjusted under 35 U.S.C. 154(b) by 0 days.

(21) Appl. No.: 18/986,700

(22) Filed: Dec. 19, 2024

(65) Prior Publication Data

US 2025/0114384 A1    Apr. 10, 2025

Related U.S. Application Data

(63) Continuation of application No. PCT/IL2024/050072, filed on Jan. 18, 2024.

(60) Provisional application No. 63/480,522, filed on Jan. 19, 2023.

(51) Int. Cl.
| | | |
|---|---|---|
| *A61K 31/685* | (2006.01) | |
| *A61K 9/00* | (2006.01) | |
| *A61K 9/127* | (2006.01) | |
| *A61K 47/18* | (2017.01) | |
| *A61K 47/26* | (2006.01) | |
| *A61P 19/02* | (2006.01) | |

(52) U.S. Cl.
CPC .......... *A61K 31/685* (2013.01); *A61K 9/0019* (2013.01); *A61K 9/127* (2013.01); *A61K 47/183* (2013.01); *A61K 47/26* (2013.01); *A61P 19/02* (2018.01)

(58) Field of Classification Search
None
See application file for complete search history.

(56) References Cited

U.S. PATENT DOCUMENTS

| | | |
|---|---|---|
| 5,403,592 A | 4/1995 | Hills |
| 5,941,909 A | 8/1999 | Purkait |
| 6,133,249 A | 10/2000 | Hills |
| 6,379,648 B1 | 4/2002 | Day et al. |
| 6,800,298 B1 | 10/2004 | Burdick et al. |
| 7,749,485 B2 | 7/2010 | Tournier et al. |
| 8,071,137 B2 | 12/2011 | Dhanaraj et al. |
| 8,623,839 B2 | 1/2014 | Su et al. |
| 8,895,054 B2 | 11/2014 | Barenholz et al. |
| 8,951,991 B2 | 2/2015 | Paoletti et al. |
| 11,123,293 B2 | 9/2021 | Barenholz et al. |
| 2002/0142048 A1 | 10/2002 | Sands et al. |
| 2004/0047807 A1 | 3/2004 | Meyer |
| 2005/0069576 A1 | 3/2005 | Mills et al. |
| 2005/0123593 A1 | 6/2005 | Thompson et al. |
| 2005/0164981 A1 | 7/2005 | Burdick et al. |
| 2006/0029655 A1 | 2/2006 | Barenholz et al. |
| 2008/0027554 A1 | 1/2008 | Talmadge |
| 2009/0232883 A1 | 9/2009 | Yoshino |
| 2011/0171288 A1 | 7/2011 | Mohammadi et al. |
| 2012/0213844 A1 | 8/2012 | Huang et al. |
| 2013/0142863 A1 | 6/2013 | Klein et al. |
| 2014/0038917 A1 | 2/2014 | Molliard et al. |
| 2015/0037404 A1 | 2/2015 | Barenholz et al. |
| 2015/0150993 A1 | 6/2015 | Kaplan |
| 2015/0216794 A1* | 8/2015 | Fetell .................. A61K 47/14 514/409 |
| 2021/0369613 A1* | 12/2021 | Barenholz ............ A61L 27/54 |
| 2022/0000898 A1* | 1/2022 | Rajendran ........... A61K 36/324 |
| 2022/0184180 A1* | 6/2022 | Ladel .................. A61P 19/02 |

FOREIGN PATENT DOCUMENTS

| | | |
|---|---|---|
| CN | 101027065 A | 8/2007 |
| CN | 104688721 A | 6/2015 |
| CN | 105377238 A | 3/2016 |
| EP | 0 319 638 A1 | 6/1989 |
| WO | 97/22345 A1 | 6/1997 |
| WO | 02/078445 A1 | 10/2002 |
| WO | 03/000190 A2 | 1/2003 |
| WO | 03/000191 A2 | 1/2003 |
| WO | 2004/047792 A2 | 6/2004 |
| WO | 2008/038292 A2 | 4/2008 |
| WO | 2009/024670 A2 | 2/2009 |
| WO | 2011/158237 A1 | 12/2011 |

(Continued)

OTHER PUBLICATIONS

Kandel et al (Abstracts/Osteoarthritis and Cartilage, 22, 2014, S193, #332) (Year: 2014).*
DeJulius et al Adv Ther (Weinh), 2021, 4(1), 1-62). (Year: 2021).*
Henrotin et al.(BMC Musculoskeletal Disorders, 2019, 20:293, 1-16). (Year: 2019).*
Akerman et al. (1987), "Intra-articular and skin surface temperature of human temporomandibular joint," Scand J. Dent. Res, 95(6): 493-498.
Ballantine et al. (2002), "The effects of lipid depletion on osteoarthritic wear," Wear 253(3-4): 385-393.

(Continued)

*Primary Examiner* — Celeste A Roney
(74) *Attorney, Agent, or Firm* — Allan A. Fanucci

(57) ABSTRACT

A method of treating a subject having an articular disorder by administration of a long-acting liposomal composition. A preferred liposomal composition includes a phosphatidylcholine as the sole active ingredient, wherein the phosphatidylcholine is selected from the group consisting of 1,2-dimyristoyl-sn-glycero-3-phosphocholine, 1,2-dipalmitoyl-sn-glycero-3-phosphocholine, 1,2-dipentadecanoyl-sn-glycero-3-phosphocholine, 1,2-distearoyl-sn-glycero-3-phosphocholine, N-palmitoyl-D-erythro-sphingosylphosphorylcholine, and a combination thereof. A preferred administration is by a single intra-articular injection once or every 4 to 12 months to afford pain relief and/or reduction of irritation in the joint of the subject.

21 Claims, 7 Drawing Sheets

(56) References Cited

FOREIGN PATENT DOCUMENTS

| WO | 2012/001679 A1 | 1/2012 |
|---|---|---|
| WO | 2012/143876 A1 | 10/2012 |
| WO | 2013/153221 A1 | 10/2013 |
| WO | 2019/038763 A1 | 2/2019 |

OTHER PUBLICATIONS

Chernos (2016), "A Rehological Study of Treatments for Osteoarthritis," a thesis submitted to the faculty of graduate and postdoctoral studies (Biomedical Engineering), University of British Columbia, Vancouver, Canada, 112 pages.
Conrozier et al. (2014), "Role of high concentrations of mannitol on the stability of hyaluronan in an oxidative stress model induced by xanthine/xanthine oxidase," Osteoarthritis and Cartilage, 22: S478.
Conrozier et al. (2014), "Mannitol Preserves the Viscoelastic Properties of Hyaluronic Acid in an In Vitro Model of Oxidative Stress," Rheumatol Ther, 1: 45-54.
Conrozier et al. (2016), "Standardized Follow-up of Patients with Symptomatic Knee Osteoarthritis Treated with a Single Intra-articular Injection of a Combination of Cross-Linked Hyaluronic Acid and Mannitol," Clin Med Insights Arthritis Musculoskelet Disord 9: 175-179.
Conrozier et al. (2016), "Safety and efficacy of intra-articular injections of a combination of hyaluronic acid and mannitol (HAnOX-M) in patients with symptomatic knee osteoarthritis: Results of a double-blind, controlled, multicenter, randomized trial," The Knee 23(5): 842-848.
Conrozier (2018), "Is the Addition of a Polyol to Hyaluronic Acid a Significant Advance in the Treatment of Osteoarthritis?," Curr Rheumatol Rev, 14(3): 226-230. Abstract.
Dauvissat et al. (2018), "Safety and Predictive Factors of Short-Term Efficacy of a Single Injection of Mannitol-Modified Cross-Linked Hyaluronic Acid in Patients with Trapeziometacarpal Osteoarthritis. Results of a Multicentre Prospective Open-Label Pilot Study (INSTINCT Trial)," Clin Med Insights Arthritis Musculoskelet Disord 11: 1179544118782901; 7 pages.
DeJulius et al. (2021), "Recent Advances in Clinical Translation of Intra-Articular Osteoarthritis Drug Delivery Systems," Author manuscript. Published in final edited form as: Adv Ther (Weinh) 4(1): 2000088. 62 pages.
Dvir et al. (2022), "Large multilamellar neutral liposomes form a stable layer on articular cartilage surface under ex-vivo physiological compression," Osteoarthritis and Cartilage, 30(Supplement 1): S435. 4 pages.
Eymard et al. (2016), "Addition of Mannitol to Hyaluronic Acid may Shorten Viscosupplementation Onset of Action in Patients with Knee Osteoarthritis: Post-Hoc Analysis of A Double-blind, Controlled Trial," J Clin Exp Orthop, 2:(3:21); 6 pages.
Feraccioli et al. (1981), "Decrease of steoarthritic synovial fluid viscosity by means of U.V. illumination: a method to evaluate the free radical scavenging action of drugs," Biochem Pharmacol, 30(13): 1805-1808.
Forsey et al. (2006), "The effect of hyaluronic acid and phospholipid based lubricants on friction within a human cartilage damage model," Biomaterials, 27(26): 4581-4590.
Glyn-Jones et al. (2015), "Osteoarthritis," Lancet, 386(9991): 376-387.
Henrotin et al. (2017), "Reduction of the Serum Levels of a Specific Biomarker of Cartilage Degradation (Coll2-1) by Hyaluronic Acid (Kartilage® Cross) Compared to Placebo in Painful Knee Osteoarthritis Patients: the EPIKART Study, a Pilot Prospective Comparative Randomized Double Blind Trial," BMC Musculoskelet Disord, 18(1): 222; 10 pages.
Hills et al. (1984), "Surfactants identified in synovial fluid and their ability to act as boundary lubricants," Annals of the Rheumatic Diseases, 43: 641-648.
Hills et al. (1998), "Deficiency of lubricating surfactant lining the articular surfaces of replaced hips and knees," British Journal of Rheumatology, 37: 143-147.
Hills et al. (1998), Release of lubricating synovial surfactant by intra-articular steroid. Br J Rheumatol 37(6): 649-652.
Hills et al. (2003), "Normal and prosthetic synovial joints are lubricated by surface-active phospholipid: a hypothesis," J Arthroplasty, 18(4): 499-505.
Hollander et al. (1956), "Studies in Osteo-Arthritis using Intra-Articular Temperature Response to Injection of Hydrocortisone Acetate and Prednisone," Ann Rheum Dis, 15(4): 320-326.
Jones et al., (2004) "The Effect of Surface Active Phospholipids on the Lubrication of Osteoarthritic Sheep Knee Joints: Wear." Tribology Letters, 16(4): 291-296.
Kandel et al. (2014), "Safety and Efficacy of Liposome Intra-Articular Injection in Moderate Knee Osteoarthritis. a Prospective Randomized Double-Blinded Study," Abstract No. 2234. 2014 ACR/ARHP Annual Meeting, Nov. 14-19, 2014 in Boston, MA, USA. 3 pages.
Kandel et al. (2014), "Safety and efficacy of MM-II, an intra-articular injection of liposomes, in moderate knee osteoarthritis. Prospective randomized double-blinded study," Osteoarthritis and Cartilage, 22 (Supplement), S193.
Kandel et al. (2015), "Safety and Efficacy of Liposome Intraarticular Injection in Moderate Knee Osteoarthritis: A RCT," A poster presented at the American Academy of Orthopaedic Surgeons (AAOS), Mar. 24-28, 2015; Las Vegas, Nevada, USA. 3 pages.
Kawano et al. (2003), "Mechanical effects of the intraarticular administration of high molecular weight hyaluronic acid plus phospholipid on synovial joint lubrication and prevention of articular cartilage degeneration in experimental osteoarthritis," Arthritis Rheum, 48(7): 1923-1929.
Lertwanich et al. (2016), "Efficacy of a Single Intra-Articular Injection of 2% Sodium Hyaluronate Plus 0.5% Mannitol in Patients with Symptomatic Osteoarthritis of the Knee: A Preliminary Report," J Med Assoc Thai, 99(10): 1094-1101.
Mehta et al. (2011), "Adaptive increase in sample size when interim results are promising: a practical guide with examples," Stat Med, 30(28): 3267-3284.
Merkher et al. (2006), "A rational human joint friction test using a human cartilage-on-cartilage arrangement," Tribology Letters, 22(1): 29-36.
Nitzan et al. (2004), "TMJ lubrication system: its effect on the joint function, dysfunction, and treatment approach," Compend Contin Educ Dent, 25(6): 437-8, 440, 443-4 passim; quiz 449, 471.
Oloyede et al. (2004), "Consolidation responses of delipidized articular cartilage," Clin Biomech (Bristol, Avon), 19(5): 534-542.
Pickard et al. (1998), "Investigation into the effects of proteins and lipids on the frictional properties of articular cartilage," Biomaterials, 19(19): 1807-1812.
Rinaudo et al. (2014), "Effect of Mannitol on Hyaluronic Acid Stability in Two in Vitro Models of Oxidative Stress," Polymers, 6(7): 1948-1957.
Sarma et al. (2001), "Phospholipid composition of articular cartilage boundary lubricant," J Orthop Res, 19(4): 671-676.
Schwarz et al. (1998), "Surface-active phospholipid as the lubricating component of lubricin," Br J Rheumatol, 37(1): 21-26.
Sivan et al. (2010), "Liposomes act as effective biolubricants for friction reduction in human synovial joints, " Langmuir, 26(2): 1107-1116.
Talsma et al. (1991), "The cryopreservation of liposomes. 1. A differential scanning calorimetry study of the thermal behavior of a liposome dispersion containing mannitol during freezing/thawing," Pharm Res, 8(8): 1021-1026.
Thomas et al. (1980), "Knee-joint temperature measurement using a differential thermistor thermometer," Rheumatol Rehabil, 19(1): 8-13.
Varjú et al. (2004), "Assessment of hand osteoarthritis: correlation between thermographic and radiographic methods," Rheumatology (Oxford), 43(7): 915-919.
Vecchio et al. (1999), "Surfactant treatment for osteoarthritis," Rheumatology (Oxford), 38(10): 1020-1021.

(56) References Cited

OTHER PUBLICATIONS

Verberne et al. (2010), "Liposomes as potential biolubricant additives for wear reduction in human synovial joints," Wear 268(7-8): 1037-1042.
Watanabe et al. (2000), "Ultrastructural study of upper surface layer in rat articular cartilage by "in vivo cryotechnique" combined with various treatments," Med Electron Microsc, 33(1): 16-24.
Yui et al. (1992), "Inflammation responsive degradation of cross-linked hyaluronic acid gels," Journal of Controlled Release, 22(2): 105-116.
Zhang et al. (2010), "Epidemiology of osteoarthritis," Clin Geriatr Med, 26(3): 355-369.
"New Technology for Catalyst Chemical Production," Edited by: Wang Duoren. Scientific and Technical Documents Publishing House, Beijing, China; 1st edition, May 2001. pp. 410-413 (with machine translation).
Handbook of Pharmaceutical Excipients. Edited by Rowe RC, Sheskey PJ and Quinn ME. Sixth edition, 2009, Pharmaceutical Press, XP055694353, p. 283.

* cited by examiner

LONG-ACTING LIPOSOMAL COMPOSITION FOR TREATMENT OF PAIN IN ARTICULAR DISORDERS

CROSS-REFERENCE TO RELATED APPLICATIONS

This application is a continuation of International Application No. PCT/IL2024/050072 filed Jan. 18, 2024, which claims priority of U.S. Provisional Patent Application No. 63/480,522 filed Jan. 19, 2023. The content of each earlier filed application is expressly incorporated herein by reference thereto.

FIELD OF THE INVENTION

The present invention relates to liposomal pharmaceutical compositions for use in the treatment of pain in articular disorders.

BACKGROUND OF THE INVENTION

Osteoarthritis (OA) is the most common form of joint diseases, and is characterized by articular cartilage degradation, osteophyte formation, bone remodeling, joint space narrowing, and joint inflammation. The etiology of OA is unknown, but is believed to be multifactorial, including hereditary, metabolic causes, mechanical damages, and inflammatory in nature. Osteoarthritis of the knees has higher prevalence than any other joints. Clinical manifestations of OA in the knees include pain in and around the joint, particularly on weight-bearing of the knee joint, stiffness of the joint after rest, and limited joint motion due to pain and/or stiffness of the joint. The end result of all forms of OA is often loss of function of the joint or limb, imposing significant economic burden on the individuals as well as the society. Diagnosis of OA is based on signs and symptoms, and is often confirmed with imaging studies or using laboratory tests to rule out concomitant inflammatory causes. Since the pathophysiology of OA is unknown, current recommendations for managing OA focus on relieving pain and stiffness, and improving physical function as important goals of therapy. Non-surgical treatment of OA focuses on reducing overloading of joints, physiotherapy, and alleviation of pain and inflammation, usually by topical, systemic, or intra-articular (IA) administration of drugs.

Currently available medication regimens for most OA patients include non-opioid analgesics. This is mainly because long-term opioid use for OA is generally discouraged due to lack of information on benefits as well as risks of addiction and other side effects. Accordingly, agents such as acetaminophen/paracetamol, nonsteroidal anti-inflammatory drugs (NSAIDs), counter-irritants, glucosamine or chondroitin, corticosteroids, and injectable hyaluronic acid are typically used. While these pharmaceutical agents can provide transient pain relief quite effectively, long-term use of NSAIDs has been found to be associated with increased risk of gastrointestinal bleeding, hypertension, cardiovascular events, congestive heart failure, and renal insufficiency. NSAIDs in the form of topical application and cyclooxygenase II (COX II) inhibitors are considered somewhat safer than other NSAIDs in terms of gastrointestinal side effects, although COX II inhibitors are contraindicated in patients with a history of coronary artery disease (Mehta et al., Statistics in Medicine. 2011; 30(28): 3267-3284; Zhang et al., Clin Geriatr Med. 2010; 26:3 55-369; Glyn-Jones et al., Lancet. 2015; 386: 376-387). While corticosteroid injections reduce inflammation and ease pain faster than NSAIDs, their relief is only temporary. Corticosteroid injections are typically given every three months and the number of injections is typically limited to four in the same joint.

Because of the high incidence of side effects associated with long-term therapy of NSAIDs and corticosteroids, effective and safer alternative treatments for OA are urgently needed.

Hyaluronic acid (HA) injections are generally administered every week for 3 to 5 weeks. Even though HA injections were found to be safe when used for prolonged periods, various studies report that they offer only a small benefit. Additionally, injectable HA compositions are known to have various side effects, such as mobility difficulties, muscle pain or stiffness, pain in the joints and swelling or redness in the joint.

Lubrication of cartilage within synovial joints entails a complex interaction of several mechanical and molecular factors, resulting in decreased friction between opposing surfaces of articular cartilage. In healthy weight-bearing joints, a layer of lubricating molecules covers the surfaces of articular cartilage and acts as a boundary lubricant, effecting nearly frictionless motion of the joints. The lubricant components of the synovial fluid (SF) include, inter alia, hyaluronic acid or hyaluronan, lubricin, and surface-active phospholipids. Various studies have been conducted to assess the efficiency of phospholipids in the lubrication of joints.

U.S. Pat. No. 6,800,298 discloses dextran-based hydrogel compositions containing lipids, particularly phospholipids, for lubrication of mammalian joints.

US Patent Application 2005/0123593 is directed to a composition comprising glycosaminoglycans encapsulated in a liposomal delivery system for intraarticular administration for the treatment of osteoarthritis.

U.S. Pat. No. 8,895,054 concerns methods of joint lubrication and/or prevention of cartilage wear making use of liposomes consisting essentially of phospholipid membranes having a phase transition temperature in the range of about 20° C. to about 39° C.

International Patent Application WO 2019/038763 is directed to a pharmaceutical composition for joint lubrication comprising a non-ionic tonicity agent comprising a polyol, and glycerophospholipid- or sphingomyelin-based liposomes having a phase transition temperature which is below the temperature of the joint.

International Patent Application WO 2003/000191 relates to a composition and method for treating arthritis comprising one or more glycosaminoglycans in combination with one or more hyaluronidase inhibitors, wherein the hyaluronidase inhibitors can be selected from heparan sulphate, dextran sulphate and xylose sulphate, and wherein hyaluronic acid can be co-encapsulated with a hyaluronidase inhibitor in liposomes.

There remains an unmet need for a therapeutically effective pharmaceutical composition for joint lubrication, which would provide a long-lasting effect, while reducing the probability of side effects associated with frequent intra-articular administrations.

SUMMARY OF THE INVENTION

The present invention provides a liposomal formulation for use in the treatment of pain or irritation in a joint of a subject having an articular disorder. The formulation of the present invention comprises liposomes, as an active ingredient, which comprise phospholipid membranes having a phase transition temperature which is slightly lower than the physiological temperature of the joint (i.e., in the range of about 20° C. to about 39° C.). The liposomes are therefore in the liquid-disordered (LD) phase when administered to the synovial joint.

It is now disclosed for the first time that a single intra-articular injection of a liposomal pharmaceutical composition according to the principles of the present invention provided pain relief to the subject, where the pain relief extended for six months. In particular, nominal significant reduced pain scores were obtained by the WOMAC A pain score, and statistically significant reduced pain scores were obtained by the weekly average daily knee pain score by VAS, and patient's global assessment. Pain relief was also manifested by a reduction in the use of rescue medication for pain relief. Furthermore, the liposomal composition was found to be safe and well tolerated. Thus, administration of the liposomal composition once, or once in more than every three months is beneficial to treat articular disorders, in particular osteoarthritis.

According to one aspect, the present invention provides a liposomal composition for use in a method of treating pain or irritation in a joint of a subject having an articular disorder, the method comprises the administration of a single intra-articular injection of a liposomal composition comprising a phosphatidylcholine (PC) selected from the group consisting of 1,2-dimyristoyl-sn-glycero-3-phosphocholine (DMPC), 1,2-dipalmitoyl-sn-glycero-3-phosphocholine (DPPC), 1,2-dipentadecanoyl-sn-glycero-3-phosphocholine (C15), 1,2-distearoyl-sn-glycero-3-phosphocholine (DSPC), N-palmitoyl-D-erythro-sphingosylphosphorylcholine (D-erythro C16), and a combination thereof as the sole active ingredient once or every 4 to 12 months.

According to another aspect, the present invention provides a method of treating pain or irritation in a joint of a subject having an articular disorder, the method comprises administration of a single intra-articular injection of a liposomal composition comprising a phosphatidylcholine (PC) selected from the group consisting of 1,2-dimyristoyl-sn-glycero-3-phosphocholine (DMPC), 1,2-dipalmitoyl-sn-glycero-3-phosphocholine (DPPC), 1,2-dipentadecanoyl-sn-glycero-3-phosphocholine (C15), 1,2-distearoyl-sn-glycero-3-phosphocholine (DSPC), D-erythro C16, and a combination thereof as the sole active ingredient once or every 4 to 12 months.

In yet another aspect, the present invention provides the use of a liposomal composition comprising a phosphatidylcholine (PC) selected from the group consisting of 1,2-dimyristoyl-sn-glycero-3-phosphocholine (DMPC), 1,2-dipalmitoyl-sn-glycero-3-phosphocholine (DPPC), 1,2-dipentadecanoyl-sn-glycero-3-phosphocholine (C15), 1,2-distearoyl-sn-glycero-3-phosphocholine (DSPC), D-erythro C16, and a combination thereof as the sole active ingredient for the preparation of a medicament for use in a method of treating pain or irritation in a joint of a subject having an articular disorder, the method comprises the administration of a single intra-articular injection of the liposomal composition once or every 4 to 12 months.

In one embodiment, treating pain or irritation in a joint of a subject having an articular disorder comprises reduction in at least one of Western Ontario and McMaster Universities Osteoarthritis Index (WOMAC) A pain score, Western Ontario and McMaster Universities Osteoarthritis Index (WOMAC) B stiffness score, Western Ontario and McMaster Universities Osteoarthritis Index (WOMAC) C disability score, Patient Global Assessment (PtGA) of disease activity by visual analog scale (VAS), weekly average of daily global pain score by visual analog scale (VAS), weekly average of daily joint pain score by visual analog scale (VAS), cumulative amount of rescue medication used for pain relief, and urinary C-terminal crosslinking telopeptide of collagen (CTX) Type II level, compared to baseline or untreated control. Each possibility represents a separate embodiment.

In another embodiment, the reduction is at least 5% reduction compared to baseline or untreated control. In yet another embodiment, the reduction is at least 10% reduction compared to baseline or untreated control. In additional embodiments, the reduction is at least 15% reduction compared to baseline or untreated control. In further embodiments, the reduction is at least 20% reduction compared to baseline or untreated control. In certain embodiments, the reduction is at least 25% reduction compared to baseline or untreated control. In various embodiments, the reduction is at least 30% reduction compared to baseline or untreated control. In particular embodiments, the reduction is at least 40% reduction compared to baseline or untreated control. In exemplary embodiments, the reduction is at least 50% reduction compared to baseline or untreated control.

In some embodiments, the subject has baseline WOMAC A pain score ≥2 and a WOMAC A pain score reduction of at least 0.5 point. In other embodiments, the subject has baseline WOMAC A pain score ≥2 and a WOMAC A pain score reduction of at least 0.75 point. In further embodiments, the subject has baseline WOMAC A pain score ≥2 and a WOMAC A pain score reduction of at least 1 point.

In certain embodiments, the subject has baseline weekly average of daily joint pain score by VAS≥50 mm and a weekly average of daily joint pain score by VAS reduction of at least 5. In various embodiments, the subject has baseline weekly average of daily joint pain score by VAS≥50 mm and a weekly average of daily joint pain score by VAS reduction of at least 10. In additional embodiments, the subject has baseline weekly average of daily joint pain score by VAS≥50 mm and a weekly average of daily joint pain score by VAS reduction of at least 15. In other embodiments, the subject has baseline weekly average of daily joint pain score by VAS≥50 mm and a weekly average of daily joint pain score by VAS reduction of at least 20. In further embodiments, the subject has baseline weekly average of daily joint pain score by VAS in the range of from 50 mm to 90 mm, including each value within the specified range.

In one embodiment, the liposomal composition is administered once. In alternative embodiments, the liposomal composition is administered once in every four months. In further alternative embodiments, the liposomal composition is administered once in every six months. In additional embodiments, the liposomal composition is administered once in every 26 weeks. According to some embodiments, the administration of the liposomal composition provides pain relief to the subject for more than three months following administration. According to further embodiments, the administration of the liposomal composition provides pain relief to the subject for at least six months following administration.

In various embodiments, the liposomal composition comprises a plurality of liposomes having a phosphatidylcholine concentration of about 50 mM to about 300 mM, including each value within the specified range. In particular embodiments, the liposomal composition comprises a plurality of liposomes having a phosphatidylcholine concentration of about 100 mM to about 200 mM, including each value within the specified range.

In various embodiments, the liposomal composition comprises 1,2-dimyristoyl-sn-glycero-3-phosphocholine (DMPC) and 1,2-dipalmitoyl-sn-glycero-3-phosphocholine (DPPC) as the sole active ingredients. In particular embodiments, the liposomal composition comprises DMPC and DPPC in a mole ratio of 25:75 to 70:30, including all iterations of ratios within the specified range. In other particular embodiments, the liposomal composition comprises DMPC and DPPC in a mole ratio of 40:60 to 50:50, including all iterations of ratios within the specified range. In particular embodiments, the mole ratio of DMPC to DPPC is about 45:55. In further embodiments, the liposomal composition comprises DMPC in a weight percent ranging from about 1% (w/w) to about 10% (w/w) and DPPC in a weight percent ranging from about 2% (w/w) to about 12% (w/w), including each value within the specified ranges. In additional embodiments, the liposomal composition comprises between about 20 mg and about 700 mg of DMPC and between about 30 mg and about 900 mg of DPPC, including each value within the specified ranges. In specific embodiments, the liposomal composition comprises between about 45 mg and about 300 mg of DMPC and between about 60 mg and about 400 mg of DPPC, including each value within the specified ranges.

According to some embodiments, the liposomal composition is administered at a volume of between about 0.5 ml and about 10 ml, including each value within the specified range. In specific embodiments, the liposomal composition is administered at a volume of between about 1 ml and about 6 ml, including each value within the specified range. In more specific embodiments, the liposomal composition is administered at a volume of about 3 ml.

In some embodiments, the liposomal composition comprises a plurality of liposomes selected from the group consisting of small unilamellar vesicles (SUV), large unilamellar vesicles (LUV), giant unilamellar vesicles (GUV), oligolamellar vesicles (OLV), multilamellar vesicles (MLV), multivesicular liposomes (MVL), and a mixture or combination thereof. Each possibility represents a separate embodiment. In one embodiment, the liposomes are multilamellar vesicles (MLV).

In certain embodiments, the liposomes have sizes ranging from about 0.3 µm to about 50 µm, including each value within the specified range. In other embodiments, the liposomes have sizes ranging from about 0.5 µm to about 10 µm, including each value within the specified range.

According to some embodiments, the liposomal composition comprises a fluid medium comprising water or a buffer. In other embodiments, the buffer is a histidine buffer. According to additional embodiments, the fluid medium further comprises a tonicity agent selected from a low molecular weight polyol and a sugar alcohol. In one embodiment, the tonicity agent is a polyol. In another embodiment, the polyol is a linear polyol. In further embodiments, the polyol is selected from the group consisting of mannitol, sorbitol, glycerol, lactitol, maltitol, dextrose, lactose, trehalose, and combinations thereof. Each possibility represents a separate embodiment. In particular embodiments, the polyol is mannitol. According to various embodiments, the weight ratio between the plurality of liposomes and the polyol ranges from about 6:1 to about 2:1, including all iterations of ratios within the specified range. In further embodiments, the polyol is present in the liposomal composition in a weight percent ranging from about 0.05% (w/w) to about 10% (w/w), including each value within the specified range.

According to certain embodiments, the liposomal composition has a pH in the range of about 5 to about 8, including each value within the specified range.

According to some embodiments, the composition is for use in the reduction of knee joint pain in osteoarthritis patients.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
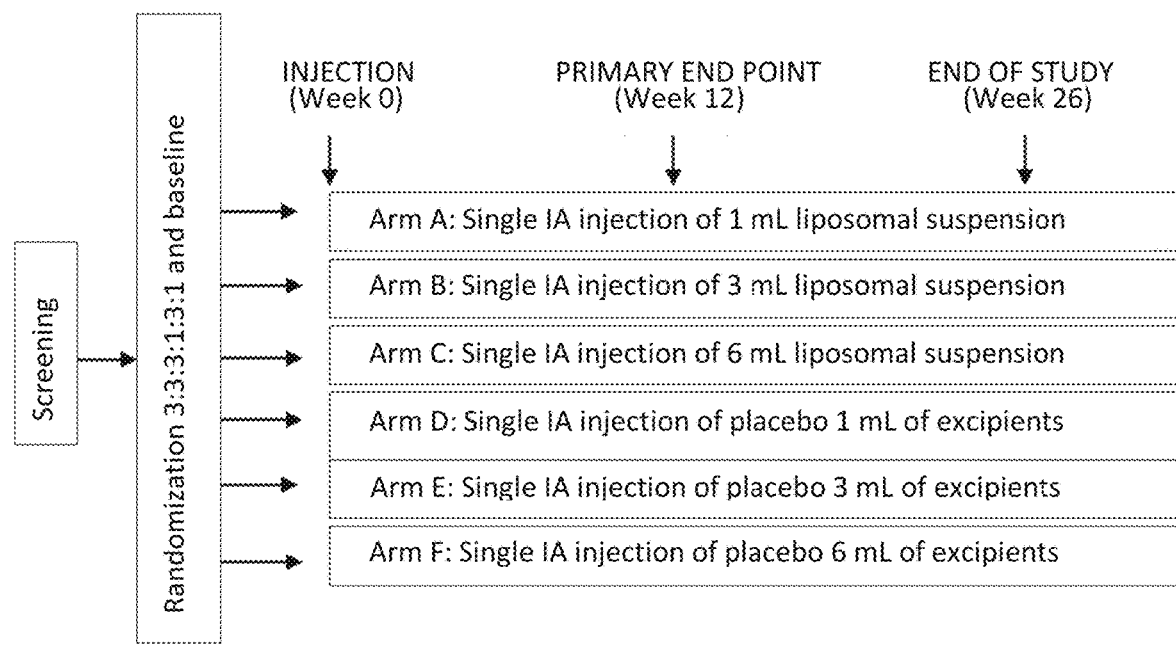
FIG. 1 shows a schematic representation of the phase IIb study design.

The present invention provides a liposomal formulation for use in the treatment of pain or irritation of mammalian joints, in which pain relief is manifested for more than three months, preferably at least six months, after a single administration. Thus, the liposomal formulation of the present invention is a long-acting composition having improved efficacy and reduced adverse effects stemming from frequent administrations.

The hitherto known drugs for OA-associated pain relief are typically administered in repeated regimens in order to achieve a long-term effect. Intra-articularly injected HA, for example, which is a widely used treatment for lower limb osteoarthritis, is rapidly degraded by reactive oxygen species (ROS), limiting its time of intra-articular residence (Conrozier et al., *Rheumatol Ther.* 2014; 1(1): 45-54).

In another study, forty patients with unilateral knee osteoarthritis were randomized into two groups, receiving a single dose injection of either an aqueous dispersion of multilamellar vesicles (MLVs) composed of DMPC and DPPC or hyaluronic acid. While the MLVs composition showed a faster onset of pain mitigation, as compared to HA, the long-term effect was not demonstrated. In particular, the MLVs composition had the highest efficiency 14 days following administration with the relative change in pain showing a steady decline from day 14 to day 90 (Kandel et al., Meeting: 2014 ACR/ARHP Annual Meeting). It was concluded that the pain-reduction action was more rapid and sustained up to 3 months compared with HA. It was therefore completely unforeseen that a single intra-articular injection of a liposomal composition comprising a combination of DMPC and DPPC in the form of MLVs can reduce joint pain and increase function in patients with OA over a period of more than three months. The composition of the present invention was shown to provide pain relief extending for six months following a single injection as manifested by various criteria including WOMAC A pain score, weekly average daily knee pain score by VAS, patient's global assessment, and reduction in the use of rescue medication for pain relief. Furthermore, the dose of 3 ml of the liposomal composition exerted unexpected efficacy as compared to the 6 ml dose. Moreover, when comparing the aforementioned efficacy of the composition of the present invention to the published efficacy of a commercially available composition containing a corticosteroid active ingredient (Zilretta®) in its Phase 3 trial, the former was shown to exert superior efficacy. Finally, improved patient compliance is achieved due to the reduction in the frequency of administrations.

Hence, the present invention provides a long-acting liposomal composition comprising a plurality of liposomes useful for the treatment of patients with an articular disorder, wherein the composition is administered in a therapeutic regimen of once or once in every four to twelve months, including each value within the specified time duration.

The term "long-acting" as used herein refers to a composition which provides prolonged, or extended effect to the local site of action in a subject or prolonged or extended duration of action in a subject. Thus, a treatment effect can be obtained for a time period extending over a period of four, five, six, seven, eight, nine, ten, eleven, twelve or more months. Each possibility represents a separate embodiment. Surprisingly, effective treatment at the local site of action is achieved with essentially no systemic effect as evident by plasma levels indicating endogenous lipid concentrations.

As used herein, the term "a liposome" refers to a vesicle characterized by an inner aqueous center surrounded by a lipid membrane typically comprising phospholipid bilayer (s). Exemplary phospholipids include, but are not limited to, phosphatidylcholine (PC), phosphatidylethanolamine, phosphatidylinositol, phosphatidylserine, phosphatidylglycerol, diphosphatidylglycerols or any derivatives or combinations thereof. Each possibility represents a separate embodiment. Suitable phosphatidylcholines within the scope of the present invention include, but are not limited to, 1,2-dimyristoyl-sn-glycero-3-phosphocholine (DMPC), 1,2-dipalmitoyl-sn-glycero-3-phosphocholine (DPPC), 1,2-distearoyl-sn-glycero-3-phosphocholine (DSPC), 1,2-dioleoyl-sn-glycero-3-phosphocholine (DOPC), 1,2-dilauroyl-sn-glycero-3-phosphocholine (DLPC), 1-palmitoyl-2-oleoyl-sn-glycero-3-phosphocholine (POPC), and a mixture or combination thereof. Each possibility represents a separate embodiment. Suitable phosphatidylethanolamines include, but are not limited to, 1,2-dilauroyl-L-phosphatidyl-ethanolamine (DLPE), 1,2-dioleoyl-sn-glycero-3-phosphoethanolamine (DOPE), 1,2-diphytanoyl-sn-glycero-3-phosphoethanolamine (DPhPE), 1,3-dipalmitoyl-sn-glycero-2-phosphoethanolamine (1,3-DPPE), 1-palmitoyl-3-oleoyl-sn-glycero-2-phosphoethanolamine (1,3-POPE), biotin-phosphatidylethanolamine, 1,2-dimyristoyl-sn-glycero-3-phosphoethanolamine (DMPE), dipalmitoylphosphatidylethanolamine (DPPE), 1,2-distearoyl-sn-glycero-3-phosphoethanolamine (DSPE), and a mixture or combination thereof. Each possibility represents a separate embodiment. Suitable phosphatidylglycerols include, but are not limited to, 1,2-dimyristoyl-sn-glycero-3-(phospho-rac-(1-glycerol)) (DMPG), 1,2-dipalmitoyl-sn-glycero-3-phosphoglycerol (DPPG), 1,2-distearoylphosphatidylglycerol (DSPG), and a mixture or combination thereof. Each possibility represents a separate embodiment.

According to some embodiments, the liposomes suitable for use in the pharmaceutical composition of the present invention do not include in their bilayers a membrane active sterol, such as cholesterol.

In some aspects and embodiments, the liposomes are composed of a phosphatidylcholine (PC) selected from the group consisting of 1,2-dimyristoyl-sn-glycero-3-phosphocholine (DMPC), 1,2-dipalmitoyl-sn-glycero-3-phosphocholine (DPPC), 1,2-dipentadecanoyl-sn-glycero-3-phosphocholine (C15), 1,2-distearoyl-sn-glycero-3-phosphocholine (DSPC), D-erythro C16, and a combination thereof. Each possibility represents a separate embodiment.

The total concentration of phosphatidylcholine in the pharmaceutical composition according to some embodiments of the invention ranges from about 20 mM to about 500 mM, including each value within the specified range. In further embodiments, the concentration ranges from about 50 mM to about 300 mM, including each value within the specified range. In still further embodiments, the concentration ranges from about 100 mM to about 200 mM, including each value within the specified range. In yet further embodiments, the concentration ranges from about 130 mM to about 170 mM, including each value within the specified range. In certain embodiments, the total DMPC and DPPC concentration is about 150 mM.

Preferably, the liposomes contain a combination of DMPC and DPPC as the sole active ingredients. In some embodiments, the liposomes consist essentially of DMPC and DPPC. In other embodiments, the mole percent ratio of DMPC to DPPC is in the range of about 25:75 to about 70:30, including all iterations of ratios within the specified range. In further embodiments, the mole percent ratio of DMPC to DPPC is in the range of about 30:70 to about 65:25, from about 35:65 to about 60:30, or from about 40:60 to about 55:45, including all iterations of ratios within the specified ranges. Each possibility represents a separate embodiment. In certain embodiments, the mole percent ratio of DMPC to DPPC is about 45:55. In additional embodiments, the mole percent ratio of DMPC to DPPC is about 25:75.

In some embodiments, the total concentration of DMPC and DPPC ranges from about 10 mg/ml to about 500 mg/ml, including each value within the specified range. In further embodiments, the concentration ranges from about 30 mg/ml to about 300 mg/ml, including each value within the specified range. In still further embodiments, the concentration ranges from about 50 mg/ml to about 200 mg/ml, including each value within the specified range. In certain embodiments, the total concentration of DMPC and DPPC is about 100 mg/ml.

In some embodiments, the concentration of DMPC ranges from about 1 mg/ml to about 250 mg/ml, including each value within the specified range. In further embodiments, the concentration of DMPC ranges from about 10 mg/ml to about 100 mg/ml, including each value within the specified range. In still further embodiments, the concentration of DMPC ranges from about 20 mg/ml to about 70 mg/ml, including each value within the specified range. In certain embodiments, the concentration of DMPC is about 46 mg/ml.

In some embodiments, the concentration of DPPC ranges from about 5 mg/ml to about 300 mg/ml, including each value within the specified range. In further embodiments, the concentration of DPPC ranges from about 20 mg/ml to about 200 mg/ml, including each value within the specified range. In still further embodiments, the concentration of DPPC ranges from about 30 mg/ml to about 90 mg/ml, including each value within the specified range. In certain embodiments, the concentration of DPPC is about 60 mg/ml.

In some embodiments, the combination of DMPC and DPPC is present in the pharmaceutical composition in a weight percent ranging from about 0.1% (w/w) to about 40% (w/w), from about 0.5% (w/w) to about 30% (w/w), from about 3% (w/w) to about 30% (w/w), or from about 1% (w/w) to about 20% (w/w) of the total weight of the pharmaceutical composition, including each value within the specified ranges. In certain embodiments, DMPC and DPPC are present in the pharmaceutical composition in a weight percent of about 10% (w/w).

According to the principles of the present invention, the pharmaceutical composition comprises about 20 mg to about 700 mg of DMPC and about 30 mg to about 900 mg of DPPC, including each value within the specified ranges. According to some embodiments, the composition comprises about 20 mg to about 450 mg of DMPC and about 30 mg to about 550 mg of DPPC, including each value within the specified ranges. According to further embodiments, the composition comprises about 40 mg to about 300 mg of DMPC and about 50 mg to about 500 mg of DPPC, including each value within the specified ranges. According to yet further embodiments, the composition comprises about 100 mg to about 200 mg of DMPC and about 150 mg to about 250 mg of DPPC, including each value within the specified ranges. In one embodiment, the composition comprises about 180 mg DPPC. In another embodiment, the composition comprises about 60 mg DPPC. In additional embodiments, each dose of the pharmaceutical composition comprises about 365 mg DPPC. In a certain embodiment, each dose of the pharmaceutical composition comprises about 140 mg DMPC. In another embodiment, each dose of the pharmaceutical composition comprises about 45 mg DMPC. In a certain embodiment, each dose of the pharmaceutical composition comprises about 275 mg DMPC.

It should be emphasized that the liposomes used in the liposomal composition of the present invention are themselves used as an active ingredient and not as a carrier of a pharmaceutically active agent. According to some embodiments, the phospholipids of DMPC and DPPC are used in the pharmaceutical composition of the present invention as the sole active ingredients. As such, the pharmaceutical compositions according to the principles of the present invention are essentially free of any additional pharmaceutically active agents. The term "essentially free of any additional pharmaceutically active agent", as used herein, refers in some embodiments to the pharmaceutical composition including less than a therapeutically effective amount of the pharmaceutically active agent, which is known for use in joint lubrication, treatment of joint dysfunction, reduction of joint pain, irritation and/or wear, or any combination thereof. The term "known for use", as used herein, refers in some embodiments, to pharmaceutically active agents approved for the indicated use at the time of the invention. In further embodiments, the term "known for use" refers to pharmaceutically active agents which are mentioned in scientific literature and/or patents as being suitable for the indicated use.

In some embodiments, the liposomal composition of the present invention does not include a pharmaceutically active agent which is a lubrication agent, such as, inter alia, glycosaminoglycan or a pharmaceutically acceptable salt, ester or derivative thereof. In certain embodiments, said glycosaminoglycan is hyaluronic acid or hyaluronan-containing salt or ester. In certain embodiments, hyaluronic acid is not encapsulated within the liposome. Additionally or alternatively, hyaluronic acid is not dispersed in the fluid medium. In some currently preferred embodiments, the liposomal composition is being essentially free of hyaluronic acid, or a pharmaceutically acceptable salt or ester thereof. The term "essentially free", as used in connection with hyaluronic acid, refers in some embodiments to the composition including less than a therapeutically effective amount of hyaluronic acid or its salt or ester. In additional embodiments, the term "essentially free" refers to the composition including less than a detectable amount of hyaluronic acid or its salt or ester.

In some embodiments, the liposomal composition of the present invention does not include a pharmaceutically active agent which is a lubrication agent selected from superficial zone protein (SZP), lubricin, proteoglycan 4 and analogs and derivatives thereof.

In some embodiments, the liposomal composition of the present invention does not include a pharmaceutically active agent which is an anti-inflammatory agent, such as xylitol, betamethasone, prednisolone, piroxicam, aspirin, flurbiprofen, (+)-N-{4-[3-(4-fluorophenoxy)phenoxy]-2-cyclopenten-1-yl}-N-hydroxyurea salsalate, diflunisal, ibuprofen, fenoprofen, fenamate, ketoprofen, nabumetone, naproxen, diclofenac, indomethacin, sulindac, tolmetin, etodolac, ketorolac, oxaprozin, celecoxib, meclofenamate, mefenamic acid, oxyphenbutazone, phenylbutazone, salicylates, or phytosphingosine type agents.

In some embodiments, the liposomal composition of the present invention does not include a pharmaceutically active agent which is an antiviral agent, such as acyclovir, nelfinavir, or virazole. In some embodiments, the liposomal composition of the present invention does not include a pharmaceutically active agent which is an anti-infective agent, such as benzalkonium chloride or chlorhexidine.

In some embodiments, the liposomal composition of the present invention does not include a pharmaceutically active agent which is an antibiotic, including antibiotics belonging to the family of penicillines, cephalosporins, aminoglycosidics, macrolides, carbapenem and penem, beta-lactam monocyclic, inhibitors of beta-lactamases, tetracyclins, polipeptidic antibiotics, chloramphenicol and derivatives, polyetheric ionophores, and quinolones. Examples of such antibiotics include ampicillin, dapsone, chloramphenicol, neomycin, cefaclor, cefadroxil, cephalexin, cephradine, erythromycin, clindamycin, lincomycin, amoxicillin, ampicillin, bacampicillin, carbenicillin, dicloxacillin, cyclacillin, picloxacillin, hetacillin, methicillin, nafcillin, oxacillin, penicillin G, penicillin V, ticarcillin, rifampin, tetracycline, fusidic acid, lincomicyn, novobiocine, and spectinomycin.

In some embodiments, the liposomal composition of the present invention does not include a pharmaceutically active agent which is a steroid. The term "steroid", as used herein, refers to naturally occurring steroids and their derivatives as well as synthetic or semi-synthetic steroid analogues having steroid-like activity. The steroid can be a glucocorticoid or corticosteroid. Examples of specific natural and synthetic steroids include aldosterone, beclomethasone, betamethasone, budesonide, ciprednol, cortisone, cortivazol, deoxycortone, desonide, desoximetasone, dexamethasone, difluorocortolone, fluclorolone, flumethasone, flunisolide, fluocinolone, fluocinonide, fluocortin butyl, fluocortisone, fluorocortolone, fluorometholone, flurandrenolone, fluticasone, halcinonide, hydrocortisone, icomethasone, meprednisone, methylprednisolone, paramethasone, prednisolone, prednisone, tixocortol or triamcinolone, and their respective pharmaceutically acceptable salts or derivatives.

It is to be noted that the liposomal composition of the present invention preferably does not contain propylene glycol. It should further be noted that the liposomal composition of the present invention preferably does not contain dextran.

According to the principles of the present invention, the liposomes have structures or are in the form of small unilamellar vesicles (SUV), large unilamellar vesicles (LUV), giant unilamellar vesicles (GUV), oligolamellar vesicles (OLV), multilamellar vesicles (MLV), multivesicular liposomes (MVL), and a mixture or combination thereof. Each possibility represents a separate embodiment. The liposomes may be single-membrane liposomes or may be, according to some embodiments, multilamellar vesicles (MLVs) liposomes. According to other embodiments, the liposomes may also be large multivesicular vesicles (LMVVs) or dehydrated rehydrated vesicles (DRVs) liposomes.

In some currently preferred embodiments, the liposomes are in the form of multilamellar vesicles (MLVs). In certain such embodiments, the liposomes have more than one membrane.

According to some embodiments, the liposomes have a mean diameter greater than about 0.3 µm, greater than about 0.5 µm, greater than about 0.8 µm, or greater than about 1 µm. Each possibility represents a separate embodiment. The mean diameter of the liposomes can be less than about 10 µm, 8 µm, 7 µm, 6 µm or 5 µm. Each possibility represents a separate embodiment. According to some embodiments, the liposomes have a mean diameter in the range of between about 0.3 µm and about 10 µm, including each value within the specified range. According to further embodiments, the liposomes have a mean diameter in the range of between about 0.5 µm and about 9 µm, including each value within the specified range. According to still further embodiments, the liposomes have a mean diameter in the range of between about 1 µm and about 8 µm, including each value within the specified range. According to yet further embodiments, the liposomes have a mean diameter in the range of between about 3 µm and about 5 µm, including each value within the specified range.

The terms "mean diameter" and "mean particle size" are used herein interchangeably, referring, in some embodiments, to the mean diameter of a liposome derived from particle size distribution based on a number distribution model. In some embodiments, said terms refer to the mean diameter of a liposome derived from particle size distribution based on a volume distribution model. In additional embodiments, said terms refer to the mean diameter of a liposome derived from particle size distribution based on a surface area distribution model. Particle size distribution can be determined, inter alia, by laser light diffraction and/or by Coulter Counter method.

According to one embodiment, the MLVs are defined by a mean diameter in the range of between 0.3 µm and 10 µm, including each value within the specified range. According to another embodiment, the MLVs are defined by a mean diameter in the range of between 0.5 µm and 9 µm, including each value within the specified range. According to still further embodiments, the MLVs are defined by a mean diameter in the range of between 1 µm and 8 µm, including each value within the specified range. According to yet further embodiments, the MLVs are defined by a mean diameter in the range of between 3 µm and 5 µm, including each value within the specified range.

Within the scope of the present invention are liposomal compositions having a defined phase transition temperature of the liposomes' membranes, said temperature being below the temperature of the joint. The term "phase transition temperature", as used herein, refers in some embodiments, to a temperature at which the solid ordered (SO) to liquid disordered (LD) phase transition of the liposome occurs. The phase transition temperature of the liposomes can be evaluated by Differential Scanning Calorimetry (DSC). Various parameters of the DSC thermogram which can be examined to assess the phase transition temperature include $T_{on}$, which represents the temperature at which the SO-LD phase transition is initiated and $T_{off}$, which represents the temperature at which the SO-LD phase transition ends during heating scans, and $T_p$, and $T_m$, which represent the temperature at which the maximum change in the heat capacity during the pre-transition ($T_p$) and main transition ($T_m$) occurs, respectively. In some embodiments, the term "phase transition temperature" refers to the $T_m$. In other embodiments, the term "phase transition temperature" refers to the temperature range of the SO to LD phase transition. According to the principles of the present invention, the composition disclosed herein has a phase transition temperature in the range of about 20° C. to about 39° C., including each value within the specified range. In some embodiments, the phase transition temperature of the liposomes ranges between about 33° C. to about 37° C., including each value within the specified range. In some embodiments, DMPC and DPPC form lipid bilayers which become highly hydrated and vesiculate to form lipid vesicles (liposomes) above the SO to LD phase transition temperature. The liposome bilayers can be either in a solid ordered (SO) phase, or in a liquid disordered (LD) phase. The transformation between the SO to LD phases involves an endothermic, first order phase transition referred to as the main phase transition. $T_m$ is the temperature in which the maximum change in the heat capacity change during the SO to LD phase transition occurs.

According to the principles of the present invention, the liposomes are suspended or dispersed in a fluid medium. The fluid medium can be selected from a buffer and water. Each possibility represents a separate embodiment. In some embodiments, the fluid medium comprises a buffer. In certain embodiments, said buffer comprises a histidine buffer. The concentration of the histidine buffer can range from about 0.5 mg/ml to about 10 mg/ml, including each value within the specified range. In certain embodiments, the concentration of the histidine buffer is about 2 mg/ml. In some embodiments, the concentration of the histidine buffer ranges from about 1 mM to about 50 mM, including each value within the specified range. In certain embodiments, the concentration of the histidine buffer is about 10 mM. Histidine can be present in the composition in the form of a dissolved hydrochloric or acetate salt. In certain embodiments, the liposomal composition further comprises trace amounts of inorganic acids, such as, for example, hydrochloric acid.

In additional embodiments, the liposomal composition includes a tonicity agent. The term "tonicity agent", as used herein, refers in some embodiments to an agent that is used to reduce local irritation by preventing osmotic shock at the site of application. As was shown in U.S. Pat. No. 11,123,293 and U.S. patent application Ser. No. 17/445,089 filed Aug. 15, 2021, the contents of each of which are hereby incorporated by reference in their entirety, addition of a polyol non-ionic tonicity agent to a pharmaceutical composition comprising glycerophospholipid-based liposomes having a phase transition temperature which is below the temperature of the joint, resulted in a decrease in the cartilage friction coefficient as compared to a liposomal composition without a polyol.

According to the principles of the present invention, the polyol can be selected from a low molecular weight polyol and a sugar alcohol. Each possibility represents a separate embodiment. In some embodiments, the polyol is a linear polyol. In other embodiments, the polyol is a cyclic polyol. Non-limiting examples of polyols suitable for use in the liposomal composition of the invention include mannitol, sorbitol, glycerol, dextrose, lactose, trehalose, lactitol, and maltitol. Each possibility represents a separate embodiment. In some currently preferred embodiments, the polyol is mannitol.

In some embodiments, the liposomal composition comprises a combination of polyols, e.g., a combination of mannitol and glycerol. The liposomal composition can further include a combination of a polyol with an additional tonicity agent. In some embodiments, the polyol does not include xylitol.

It is to be emphasized that according to some currently preferred embodiments, the tonicity agent is not encapsulated within the liposomes. The term "encapsulated", as used herein, refers in some embodiments, to the concentration of the tonicity agent inside the liposome being substantially higher than in the medium outside the liposome. The term "inside the liposome" is to be understood as encompassing at least one inner aqueous phase of the liposome. The term "concentration" can include osmotic concentration. The term "substantially higher", as used herein, refers in some embodiments to the difference in the concentration of at least about 90%. In some embodiments, the polyol is not encapsulated within the liposomes. In further embodiments, mannitol is not encapsulated within the liposomes.

According to further embodiments, the concentration of the polyol inside the liposome is essentially the same as the concentration of the polyol in the medium outside the liposome. According to still further embodiments, the concentration of mannitol inside the liposome is essentially the same as the concentration of mannitol in the medium outside the liposome. The term "essentially the same", as used herein, refers in some embodiments, to the difference in the concentration of less than about 15%. In further embodiments, the term "essentially the same" refers to the difference in the concentration of less than about 10%, less than about 5%, less than about 2.5%, or less than about 1%. Each possibility represents a separate embodiment.

In some embodiments, the liposomes are not freeze-dried. In further embodiments, the liposomes are not freeze-dried and/or thawed prior to the administration to the joint.

In some embodiments, the concentration of the polyol in the liposomal composition ranges from about 0.5 to about 100 mg/ml, including each value within the specified range. In further embodiments, the concentration of the polyol ranges from about 1 to about 70 mg/ml, including each value within the specified range. In still further embodiments, the concentration of the polyol ranges from about 2.5 to about 60 mg/ml, including each value within the specified range.

In yet further embodiments, the concentration of the polyol ranges from about 5 to about 50 mg/ml, including each value within the specified range. In still further embodiments, the concentration of the polyol ranges from about 30 to about 50 mg/ml, including each value within the specified range. In certain embodiments, the concentration of the polyol ranges from about 5 to about 30 mg/ml, including each value within the specified range.

In some embodiments, the concentration of mannitol in the liposomal composition ranges from about 1 mg/ml to about 70 mg/ml, including each value within the specified range. In further embodiments, the concentration of mannitol ranges from about 10 mg/ml to about 70 mg/ml, including each value within the specified range. In still further embodiments, the concentration of mannitol ranges from about 10 mg/ml to about 50 mg/ml, including each value within the specified range. In certain embodiments, the concentration of mannitol is about 40 mg/ml. In additional embodiments, the concentration of mannitol is about 20 mg/ml.

In some embodiments, the concentration of glycerol in the liposomal composition ranges from about 0.5 mg/ml to about 50 mg/ml, including each value within the specified range. In further embodiments, the concentration of glycerol ranges from about 1 mg/ml to about 40 mg/ml, including each value within the specified range. In still further embodiments, the concentration of glycerol ranges from about 5 mg/ml to about 30 mg/ml, including each value within the specified range. In certain embodiments, the concentration of glycerol is about 20 mg/ml. In additional embodiments, the concentration of glycerol is about 10 mg/ml.

In some embodiments, the concentration of the polyol in the liposomal composition ranges from about 50 to about 500 mM, including each value within the specified range. In further embodiments, the concentration of the polyol ranges from about 100 to about 400 mM, including each value within the specified range. In still further embodiments, the concentration of the polyol ranges from about 200 to about 300 mM, including each value within the specified range. The polyol can be selected from mannitol and glycerol.

In some embodiments, the polyol is present in the liposomal composition in a weight percent ranging from about 0.05% (w/w) to about 10% (w/w), from about 0.1% (w/w) to about 7% (w/w), from about 0.5% (w/w) to about 10% (w/w), or from about 1% (w/w) to about 5% (w/w) of the total weight of the liposomal composition, including each value within the specified ranges. In certain embodiments, the weight percent of the polyol is about 4% (w/w). In additional embodiments, the weight percent of the polyol is about 2% (w/w).

In some embodiments, mannitol is present in the liposomal composition in a weight percent ranging from about 0.1% (w/w) to about 7% (w/w), from about 0.5% (w/w) to about 10% (w/w), or from about 1% (w/w) to about 7% (w/w) of the total weight of the liposomal composition, including each value within the specified ranges. In certain embodiments, the weight percent of mannitol is about 4% (w/w).

In some embodiments, glycerol is present in the liposomal composition in a weight percent ranging from about 0.05% (w/w) to about 5% (w/w), or from about 0.5% (w/w) to about 5% (w/w) of the total weight of the liposomal composition, including each value within the specified ranges. In certain embodiments, the weight percent of glycerol is about 2% (w/w).

In some embodiments, the liposomal composition, which is administered to the subject, comprises from about 10 mg to about 700 mg polyol, including each value within the specified range. In some embodiments, the liposomal composition comprises from about 20 mg to about 500 mg polyol, including each value within the specified range. In additional embodiments, the liposomal composition comprises from about 20 mg to about 350 mg polyol, including each value within the specified range. In further embodiments, the liposomal composition comprises from about 40 mg to about 250 mg polyol, including each value within the specified range. In some embodiments, the liposomal composition comprises from about 10 mg to about 175 mg polyol, including each value within the specified range. In further embodiments, the liposomal composition comprises from about 20 mg to about 125 mg polyol, including each value within the specified range. In some embodiments, the liposomal composition comprises from about 40 mg to about 700 mg polyol, including each value within the specified range. In further embodiments, the liposomal composition comprises from about 100 mg to about 500 mg polyol, including each value within the specified range.

In some embodiments, the liposomal composition comprises from about 20 mg to about 350 mg mannitol, including each value within the specified range. In some embodiments, the liposomal composition comprises from about 40 mg to about 250 mg mannitol, including each value within the specified range. In a certain embodiment, the liposomal composition comprises about 120 mg mannitol. In another embodiment, the liposomal composition comprises about 40 mg mannitol. In an additional embodiment, the liposomal composition comprises about 250 mg mannitol.

In some embodiments, the liposomal composition has osmolality in the range of from about 200 to about 600 mOsm, including each value within the specified range. In further embodiments, the liposomal composition has osmolality in the range of from about 250 to about 500 mOsm, including each value within the specified range. In further embodiments, the liposomal composition has osmolality in the range of from about 250 to about 400 mOsm, including each value within the specified range. In certain embodiments, the liposomal composition has osmolality of about 300 mOsm. In certain such embodiments, the liposomal composition is isotonic.

In some embodiments, the weight ratio between the liposomes and the polyol ranges from about 30:1 to about 1:2, including all iterations of ratios within the specified range. In further embodiments, the weight ratio between the liposomes and the polyol ranges from about 15:1 to about 2:1, including all iterations of ratios within the specified range. In still further embodiments, the weight ratio between the liposomes and the polyol ranges from about 10:1 to about 2:1, including all iterations of ratios within the specified range. In yet further embodiments, the weight ratio between the liposomes and the polyol ranges from about 6:1 to about 2:1, including all iterations of ratios within the specified range. In additional embodiments, the weight ratio between the liposomes and the polyol ranges from about 10:1 to about 6:1, including all iterations of ratios within the specified range.

In some embodiments, the weight ratio between the liposomes and mannitol ranges from about 10:1 to about 1:1, including all iterations of ratios within the specified range. In further embodiments, the weight ratio between the liposomes and mannitol ranges from about 6:1 to about 2:1, including all iterations of ratios within the specified range. In certain embodiments, the weight ratio between the liposomes and mannitol is about 4:1.

In some embodiments, the weight ratio between the liposomes and glycerol ranges from about 15:1 to about 2:1, including all iterations of ratios within the specified range. In further embodiments, the weight ratio between the liposomes and glycerol ranges from about 12:1 to about 2:1, including all iterations of ratios within the specified range. In still further embodiments, the weight ratio between the liposomes and glycerol ranges from about 10:1 to about 6:1, including all iterations of ratios within the specified range.

The pH of the liposomal composition can range between about 5 to about 8, including each value within the specified range. In some embodiments, the pH ranges between about 6 and about 7, including each value within the specified range. In certain embodiments, the pH of the liposomal composition is about 6.5.

In some embodiments, the pH of the liposomal composition can be adjusted by the use of an inorganic acid or base. Non-limiting examples of suitable inorganic acids include hydrochloric acid and sulfuric acid. Each possibility represents a separate embodiment. Non-limiting examples of suitable inorganic bases include sodium hydroxide and potassium hydroxide. Each possibility represents a separate embodiment.

According to some embodiments, the liposomal composition consists essentially of the non-ionic tonicity agent comprising a polyol, the liposomes, and the fluid medium in which the liposomes are suspended, as described herein. In some embodiments, the term "consisting essentially of" refers to a composition whose only active ingredient is the indicated active ingredient (i.e., liposomes), however, other substances may be included which are for stabilizing, preserving, or controlling osmolarity, viscosity and/or pH of the formulation, but are not involved directly in the therapeutic effect of the liposomes and/or phospholipids. In some embodiments, the term "consisting" refers to a composition, which contains the liposomes, the tonicity agent, the fluid medium, and a pharmaceutically acceptable excipient.

The liposomal compositions according to the various embodiments of the invention can be sterilized and if desired mixed with auxiliary agents, e.g., preservatives, stabilizers, wetting agents, synthetic emulsifiers, additional salts for influencing osmotic pressure, coloring, and/or aromatic substances and the like which do not deleteriously react with the liposomes.

According to the principles of the present invention, the liposomal composition disclosed herein is useful in a method of treating pain or irritation in a joint of a subject having an articular disorder, the method comprising administering into a cavity of the joint the liposomal composition at a regimen of once or once every 4 to 12 months. In one embodiment, a single administration (i.e., a single dose) is sufficient to exert its therapeutic effect thereby obviating the need for additional injections. The term "single dose", as used herein, means that one dose of the liposomal composition effectively alleviates pain or irritation in a joint of a subject for a prolonged time. The term "prolonged time", as used herein, refers in some embodiments, to a period of more than three months. In further embodiments, the term "prolonged time" refers to a period of at least four months. In still further embodiments, the term "prolonged time" refers to a period of at least five months. In yet further embodiments, the term "prolonged time" refers to a period of at least six months. In further embodiments, the term "prolonged time" refers to a period of at least 26 weeks. In still further embodiments, the term "prolonged time" refers to a period of at least seven months. In yet further embodiments, the term "prolonged time" refers to a period of at least eight months. In yet further embodiments, the term "prolonged time" refers to a period of at least nine months. In yet further embodiments, the term "prolonged time" refers to a period of at least ten months. In yet further embodiments, the term "prolonged time" refers to a period of at least eleven months. In yet further embodiments, the term "prolonged time" refers to a period of at least twelve months. According to some embodiments, the single dose provides pain relief to the subject for at least four months following administration. According to further embodiments, the single dose provides pain relief to the subject for at least five months following administration. According to still further embodiments, the single dose provides pain relief to the subject for at least six months following administration. According to yet further embodiments, the single dose provides pain relief to the subject for at least seven months following administration. According to still further embodiments, the single dose provides pain relief to the subject for at least eight months following administration. According to additional embodiments, the single dose provides pain relief to the subject for at least nine months following administration. According to some embodiments, the single dose provides pain relief to the subject for at least ten months following administration. According to further embodiments, the single dose provides pain relief to the subject for at least eleven months following administration. According to still further embodiments, the single dose provides pain relief to the subject for at least twelve months following administration. According to some embodiments, the single dose of the liposomal composition is administered not more often than once in six months. According to some embodiments, the single dose of the liposomal composition is administered not more often than once in eight months. According to certain embodiments, the method does not include administering an additional dose of the liposomal composition into the cavity of said joint. In some embodiments, the single dose of the liposomal composition provides a perceptible pain relief to the subject.

In other embodiments, the composition is administered once every four, five, six, seven, eight, nine, ten, eleven, twelve or more months. Each possibility represents a separate embodiment. According to the principles of the present invention, the effect exerted by the composition (i.e., pain relief) lasts at least over a period of four, five, six, seven, eight, nine, ten, eleven, twelve or more months. Each possibility represents a separate embodiment.

According to the principles of the present invention, the liposomal composition provides the treatment of a subject having an articular disorder. The term "articular disorder", as used herein, should be held to mean any affliction (congenital, autoimmune or otherwise), injury or disease of the articular region which causes degeneration, pain, reduction in mobility, inflammation, irritation, or physiological disruption and dysfunction of joints. The disorder may be associated with reduced joint secretion and lubrication as well as stemming from complications of knee or hip replacement. The term "treat", as used herein, is meant to encompass alleviation of pain.

Specific articular disorders within the scope of the present invention include, but are not limited to, deficiencies of joint secretion and/or lubrication arising from arthritis, including conditions of joint erosion in rheumatoid arthritis, osteoarthritis, osteoarthritis in rheumatoid arthritis patients, traumatic joint injury (including sports injury), locked joint (such as in temporomandibular joint (TMJ)), status post arthrocentesis, arthroscopic surgery, open joint surgery including e.g., knee or hip replacement in mammals, preferably humans. In certain embodiments, said articular disorder is osteoarthritis.

In some embodiments, the liposomal composition is useful for the reduction of knee joint pain in osteoarthritis patients.

According to the principles of the present invention, treatment of pain or irritation in a joint comprises reduction in at least one of Western Ontario and McMaster Universities Osteoarthritis Index (WOMAC) A pain score, Western Ontario and McMaster Universities Osteoarthritis Index (WOMAC) B stiffness score, Western Ontario and McMaster Universities Osteoarthritis Index (WOMAC) C disability score, Patient Global Assessment (PtGA) of disease activity by visual analog scale (VAS), weekly average of daily global pain score by visual analog scale (VAS), weekly average of daily joint pain score by visual analog scale (VAS), cumulative amount of rescue medication used for pain relief, and urinary C-terminal crosslinking telopeptide of collagen (CTX) Type II level, compared to baseline or untreated control. Each possibility represents a separate embodiment. The pain relief can be further determined by various pain assessment methods known in the art, such as, but not limited to, OMERACT OARSI responder criteria and Patient Acceptable Symptom State (PASS). Each possibility represents a separate embodiment.

The term "baseline" as used herein refers to a period of time before initiation of treatment by the liposomal composition of the present invention. In certain embodiments, the term "baseline" as used herein refers to a period of time, for example, 1 week, 2 weeks, 3 weeks, 4 weeks, one month, two months, three months, four months, five months, six months, seven months, eight months, nine months, ten months, eleven months, or one year before initiating the treatment by the liposomal composition of the present invention. Each possibility represents a separate embodiment.

According to some aspects and embodiments, the subjects have a baseline WOMAC A pain score ≥2. For example, the baseline WOMAC A pain score may be about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, or about 4.0. Each possibility represents a separate embodiment.

According to other aspects and embodiments, the subjects have a baseline weekly average of daily joint pain score by VAS≥50 mm. According to further aspects and embodiments, the subjects have a baseline weekly average of daily joint pain score by VAS of from ≥50 mm to ≤90 mm, including each value within the specified range. For example, the baseline weekly average of daily joint pain score by VAS may be about 55 mm, about 60 mm, about 65 mm, about 70 mm, about 75 mm, about 80 mm, about 85 mm, or about 90 mm. Each possibility represents a separate embodiment.

In certain embodiments, the therapeutic effect is compared to untreated control. The term "control" as used herein refers to subjects having an articular disorder that are untreated. In one embodiment, the subjects having an articular disorder are untreated using the composition of the present invention. In another embodiment, the subjects having an articular disorder are untreated with a treatment which is known for use in articular disorder.

According to some embodiments, the subjects have BMI of more than or equal to about 40 kg/m$^2$. In other embodiments, the subjects have BMI of more than or equal to about 35 kg/m². In yet other embodiments, the subjects have BMI of less than about 35 kg/m². In additional embodiments, the subjects have BMI of more than or equal to about 30 kg/m². According to further embodiments, the subjects have BMI of less than about 30 kg/m². In other embodiments, the subjects have BMI of less than about 29 kg/m². In further embodiments, the subjects have BMI of less than about 28 kg/m². In additional embodiments, the subjects have BMI of less than about 27 kg/m². In yet other embodiments, the subjects have BMI of less than about 26 kg/m². In specific embodiments, the subjects have BMI of less than about 25 kg/m². In various embodiments, the subjects have BMI in the range of about 18.5 to about 30 kg/m², including each value within the specified range. In other embodiments, the subjects have BMI in the range of about 18.5 to about 25 kg/m², including each value within the specified range. In yet other embodiments, the subjects have BMI in the range of about 30 to about 35 kg/m², including each value within the specified range.

According to some embodiments, the pain relief is manifested by a relative change from baseline, i.e., reduction in at least one of the scores detailed above. In some embodiments, the pain relief is manifested by reduction in all of the aforementioned scores. For example, reduction of at least 2%, 5%, 10%, 15%, 20%, 25%, 30%, 35%, 40%, 45%, 50%, or more in at least one of VAS for joint pain, VAS for global pain, WOMAC pain score, WOMAC stiffness score, WOMAC disability score, WOMAC composite score, PGA, consumption of rescue medicine, and urinary CTX II level is considered to afford treatment of the articular disorder. Each possibility represents a separate embodiment.

According to certain embodiments, the pain relief is manifested by a reduction from baseline or untreated control of at least 0.5 point as determined by WOMAC pain score. According to other embodiments, the pain relief is manifested by a reduction from baseline or untreated control of at least 0.75 point as determined by WOMAC pain score. According to yet other embodiments, the pain relief is manifested by a reduction from baseline or untreated control of at least 1 point as determined by WOMAC pain score. According to various embodiments, the pain relief is manifested by a reduction from baseline or untreated control of at least 1 point as determined by WOMAC pain score achieved between about 10 weeks and about 26 weeks following administration, including each value within the specified range. According to further embodiments, the pain relief is manifested by a reduction from baseline or untreated control of at least 1 point as determined by WOMAC pain score achieved at about 12 weeks following administration. According to additional embodiments, the pain relief is manifested by a reduction from baseline or untreated control of at least 1 point as determined by WOMAC pain score achieved at about 26 weeks following administration.

According to some embodiments, the pain relief is manifested by a reduction from baseline or untreated control of at least 1 point as determined by WOMAC disability score achieved between about 10 weeks and about 26 weeks following administration, including each value within the specified range. According to certain embodiments, the pain relief is manifested by a reduction from baseline or untreated control of at least 1 point as determined by WOMAC disability score achieved at about 12 weeks following administration. According to other embodiments, the pain relief is manifested by a reduction from baseline or untreated control of at least 1 point as determined by WOMAC disability score achieved at about 26 weeks following administration.

According to various embodiments, the pain relief is manifested by a reduction from baseline or untreated control of at least 5 mm, as determined by weekly average of daily joint pain scores by VAS. According to certain embodiments, the pain relief is manifested by a reduction from baseline or untreated control of at least 10 mm, as determined by weekly average of daily joint pain scores by VAS. According to further embodiments, the pain relief is manifested by a reduction from baseline or untreated control of at least 15 mm, as determined by weekly average of daily joint pain scores by VAS. According to other embodiments, the pain relief is manifested by a reduction from baseline or untreated control of at least 20 mm, as determined by weekly average of daily joint pain scores by VAS. According to particular embodiments, the pain relief is manifested by a reduction from baseline or untreated control of at least 30 mm as determined by weekly average of daily joint pain scores by VAS achieved between about 10 weeks and about 26 weeks following administration, including each value within the specified range. According to additional embodiments, the pain relief is manifested by a reduction from baseline or untreated control of at least 30 mm as determined by weekly average of daily joint pain scores by VAS achieved at about 12 weeks following administration. According to further embodiments, the pain relief is manifested by a reduction from baseline or untreated control of at least 30 mm as determined by weekly average of daily joint pain scores by VAS achieved at about 26 weeks following administration.

According to certain embodiments, the pain relief is manifested by a reduction from baseline or untreated control of at least 30 as determined by patient's global assessment achieved between about 10 weeks and about 26 weeks following administration, including each value within the specified range. According to some embodiments, the pain relief is manifested by a reduction from baseline or untreated control of at least 30 as determined by patient's global assessment achieved at about 12 weeks following administration. According to other embodiments, the pain relief is manifested by a reduction from baseline or untreated control of at least 30 as determined by patient's global assessment achieved at about 26 weeks following administration.

According to various embodiments, the pain relief is manifested by a reduction from baseline or untreated control of at least 15 as determined by weekly average of global pain achieved between about 10 weeks and about 26 weeks following administration, including each value within the specified range. According to further embodiments, the pain relief is manifested by a reduction from baseline or untreated control of at least 15 as determined by weekly average of global pain achieved at about 12 weeks following administration. According to additional embodiments, the pain relief is manifested by a reduction from baseline or untreated control of at least 15 as determined by weekly average of global pain achieved at about 26 weeks following administration.

According to further embodiments, the pain relief is manifested by a reduction in consumption of rescue medication which comprises reduction in oral administrations of systemic pain relief medicaments such as, but not limited to, acetaminophen/paracetamol, NSAIDs, opioids, etc.

According to some embodiments, onset of pain relief is achieved between about 1 day and about 2 weeks following administration, including each value within the specified range. According to other embodiments, onset of pain relief is achieved between about 3 days and about 2 weeks following administration, including each value within the specified range. According to yet other embodiments, onset of pain relief is achieved between about 4 days and about 1.5 weeks following administration, including each value within the specified range. According to particular embodiments, onset of pain relief is achieved about 1 week following administration.

According to various embodiments, maximal pain relief is achieved between about 3 weeks and about 26 weeks following administration, including each value within the specified range. According to other embodiments, maximal pain relief is achieved between about 4 weeks and about 26 weeks following administration, including each value within the specified range. According to additional embodiments, maximal pain relief is achieved between about 5 weeks and about 26 weeks following administration, including each value within the specified range. According to further embodiments, maximal pain relief is achieved between about 6 weeks and about 26 weeks following administration, including each value within the specified range. According to yet further embodiments, maximal pain relief is achieved between about 7 weeks and about 26 weeks following administration, including each value within the specified range. According to particular embodiments, maximal pain relief is achieved at about 6 to 7 weeks following administration, which pain relief extends for at least 26 weeks.

In some embodiments, the liposomal composition disclosed herein confers at least 30%, 40%, or 50% response rate in subjects administered with said liposomal composition. Each possibility represents a separate embodiment. In some particular embodiments, the liposomal composition disclosed herein confers from about 30% to about 50% response rate in subjects administered with said liposomal composition, including each value within the specified range.

The joint in accordance with the principles of the invention may be any one of the knees, hip, ankle, shoulder, elbow, tarsal, carpal, interphalangeal, and intervertebral. Each possibility represents a separate embodiment. In certain embodiments, said joint is a knee joint.

In some embodiments, the liposomal composition is in a form suitable for parenteral administration. The parenteral administration of the liposomal composition of the invention into an articular cavity of a patient can be performed by a method chosen from the group consisting of intra-articular injection, arthroscopic administration, and surgical administration. Each possibility represents a separate embodiment. Accordingly, in some embodiments, the liposomal composition is formulated in a form suitable for administration by a route selected from intra-articular injection, arthroscopic administration, and by surgical administration. Each possibility represents a separate embodiment. In some currently preferred embodiments, the liposomal composition is administered via intra-articular injection.

The liposomal composition according to the various embodiments of the invention may be administered at a volume of from about 0.5 ml to about 10 ml, including each value within the specified range. In further embodiments, the liposomal composition is administered at a volume of from about 1 ml to about 6 ml, including each value within the specified range. In certain embodiments, the liposomal composition is administered at a volume of about 3 ml. In other embodiments, the liposomal composition is administered at a volume of about 1 ml. In additional embodiments, the liposomal composition is administered at a volume of about 6 ml. The composition can be portioned in vials or in single injections or any other convenient way for practical use. The composition may also be provided in a pre-filled syringe.

Subjects to which administration of the liposomal compositions of the invention is contemplated include mammals, such as, but not limited to, humans and other primates.

According to some embodiments, the therapeutic regimen of the present invention provides equal or superior therapeutic efficacy to the commercially available compositions, with reduced incidence of side effects and/or with reduced severity of side effects at the local and/or systemic level. Side effects which are known to be associated with commercially available compositions include, but are not limited to, mobility difficulties, muscle pain or stiffness, pain in the joints and swelling or redness in the joint. Administering the liposomal composition of the present invention in the regimen of once or once in every 4 to 12 months affords reduced incidence or severity of these side effects. In some embodiments, these side effects are altogether avoided.

The present invention thus provides a method of increasing the tolerability of a subject having an articular disorder to treatment, the method comprising reducing the frequency of administrations to a therapeutically effective regimen of once or once every 4 to 12 months by administering the liposomal composition of the present invention. In certain embodiments, increasing the tolerability comprises reducing the frequency of injections. In other embodiments, increasing the tolerability comprises reducing the frequency of an injection site reaction. In yet other embodiments, increasing the tolerability comprises improving patient compliance.

Throughout the description and claims of this specification, the singular forms "a", "an" and "the" include plural references unless the context clearly dictates otherwise. Thus, for example, a reference to "a liposome" is a reference to one or more liposomes. Throughout the description and claims of this specification, the plural forms of words include singular references as well, unless the context clearly dictates otherwise. It should be noted that the term "and" or the term "or" is generally employed in its sense including "and/or" unless the context clearly dictates otherwise.

Throughout the description and claims of this specification, the words "comprise" and "contain" and variations of the words, for example "comprising" and "comprises", mean "including but not limited to", and are not intended to (and do not) exclude other moieties, additives, components, integers or steps.

As used herein, the term "about", when referring to a measurable value such as an amount, a temporal duration, and the like, is meant to encompass variations of ±10%, more preferably ±5%, even more preferably ±1% from the specified value, as such variations are appropriate to perform the disclosed methods.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1—A Phase IIb, Randomized, Double-Blind, Placebo-Controlled, Single-Administration, Multiple-Dose Study A phase IIb clinical trial was conducted in order to assess the safety and efficacy of a single intra-articular (IA) joint injection of a liposomal suspension containing 46.1 mg/ml DMPC and 60.2 mg/ml DPPC at a concentration of 150 mM in patients having symptomatic knee OA. The fluid medium of the suspension contained a histidine buffer and mannitol tonicity agent. As control, placebo samples containing the fluid medium with no liposomes were used.

Subjects Inclusion Criteria:
1. Men or women ≥40 years of age at the time of screening.
2. Radiographic evidence of knee OA on standing AP view in conjunction with fixed flexion frame (i.e., Synaflexor) to determine a Kellgren-Lawrence K-L Grade 2 or 3 in the index knee on X-ray performed within the previous 12 months.
3. Chronic OA of index knee confirmed by American College of Rheumatology (ACR) criteria (clinical and radiological) at screening.
4. Presence of index knee pain for at least 6 months prior to screening.
5. Severity of pain (index knee) of WOMAC (0-4 range; mean of 5 questions) pain score ≥2 for the last 24 hours prior to screening and baseline.
6. Severity of pain (index knee) of VAS pain score ≥50 mm and ≤90 mm in ≥5 of the 7 days prior to baseline.
7. Index knee pain of >15 days in the preceding month of screening.
8. Have an inadequate response or intolerance to previous acetaminophen/paracetamol or a non-steroidal anti-inflammatory drug (NSAID).
9. Ability and willingness to use only acetaminophen/paracetamol (no more than 4 grams daily) as an analgesic rescue medication for knee pain.
10. Non-drug therapy, if applicable, stable in frequency for the 4-week period prior to IP initiation through to the end of the study.
11. Topical analgesics (except for the index knee) and nasal or inhaled corticosteroids use, if applicable, stable dosage and regimen for at least 2 months prior to enrollment and continued throughout the study period.

Primary Endpoint:
The change from baseline of WOMAC A pain score at week 12 to determine the dose of the liposomal composition.

Secondary Endpoints:
The secondary efficacy endpoints are the change from baseline for:
WOMAC A pain score at week 26 and over time;
WOMAC stiffness and disability sub-scores at weeks 12, 26 and over time;
The weekly average of daily knee pain scores by VAS at weeks 12, 26 and over time;
The weekly average of daily global pain scores by VAS at weeks 12, 26 and over time;
PtGA of disease activity at weeks 12, 26 and over time;
The weekly cumulative amount of rescue medication (acetaminophen/paracetamol) use at weeks 12, 26 and over time.

Exploratory Endpoints:
30% and 50% improvement in WOMAC A pain score from baseline;
Pharmacokinetic endpoints.

Study Design and Statistics:
Subjects were randomized to Arms A-F according to the following: 1) BMI<30 kg/m$^2$, 30 kg/m$^2$≤BMI<35 kg/m$^2$, and BMI≥35 kg/m$^2$; subjects with BMI≥40 kg/m$^2$ were capped at 10% of the total number of subjects; and 2) index knee pain VAS≤74, VAS≥75 at baseline. BL WOMAC A pain score >2.0; SD=0.59. Change from baseline in WOMAC A pain score of 0.80 for the liposomal suspension and 0.52 for placebo, yielding a difference of 0.28 between the groups. Power=80%; alpha=0.05. Approximately 72 subjects were assigned to each arm (in arms A, B, C & E).

Subjects received a single IA joint injection of the liposomal suspension or placebo at volumes outlined below.
Arm A: Single IA joint injection of the liposomal suspension (1 mL);
Arm B: Single IA joint injection of the liposomal suspension (3 mL);
Arm C: Single IA joint injection of the liposomal suspension (6 mL);
Arm D: Single IA joint injection of placebo (1 mL);
Arm E: Single IA joint injection of placebo (3 mL); and
Arm F: Single IA joint injection of placebo (6 mL).

For primary efficacy endpoint, analysis was performed using the Mixed Effect Model (MMRM) with fixed effects for treatment group, study visit, treatment-by-visit interaction, site and baseline covariates. Treatment differences were estimated for all active arms (A, B, C) vs. placebo 3 mL (Arm E) estimated via the least square means from the analysis model along with 95% confidence intervals, and associated 2-sided p-values. The study design is schematically shown in FIG. 1.

Efficacy Assessments:
Knee Joint Examination
The blinded investigator performed knee joint assessment of both knees at screening, baseline, and follow-up. At screening and baseline, the index knee joint was examined for any deformities, bruises, open wounds (i.e., abrasion wound), or surgical scars that suggest a history of knee surgery, such as reconstructive surgery or total knee joint arthroplasty, etc. The index knee was palpated to determine erythema or the size of knee joint effusion. Erythema or moderate (or large) knee joint effusion suggested conditions such as inflammatory arthropathy and were therefore excluded the subject from the study.

Patients underwent X-ray and WOMAC pain scoring at screening. The selection of index knee was performed based on screening and baseline pain report (WOMAC and daily pain during the past seven days), and KL-grade. If eligible based on X-ray, daily pain scoring past seven days, and other knee-specific criteria, the knee with the highest WOMAC pain score at baseline was selected as the index knee. If the knee with the highest pain score at baseline did not meet the KL-criterion or the daily pain criterion, exclusion criterion 1 (non-target knee has moderate/severe pain) was applied, and the subject was screen-failed, regardless of eligibility of the other knee.

WOMAC Evaluation of Knee Osteoarthritis
The WOMAC survey comprised of 24 items divided into three subscales: pain (5 items), stiffness (2 items), and physical function (17 items). Subjects were asked a range of questions about their knee pain, knee stiffness, their ability to carry out daily activities such as using the stairs, rising from sitting, lying in bed, and conducting light or heavy domestic duties. All the items were scored on a scale of 0-4 (lower scores indicated lower levels of symptoms or physical disability). Values were summed up for a combined WOMAC score (WOMAC total score) or subscores (WOMAC A pain score, etc.), and means were calculated for total and subscores on the 0-4 scale. The higher the score, the higher the amount of pain, stiffness, and a high level of functional limitations.

Weekly Average of Daily Knee Pain by VAS
The subjects were asked a question: "By tapping on the line, please indicate how much knee pain on average you have had in your <L/R> knee during the past 24 hours." The subjects responded to the questions on a VAS scale (0-100), the lower figures on the scale indicating less amount of knee pain experienced.

Weekly Average of Daily Global Pain Scores by VAS

The subjects were asked a question: "By tapping on the line, please indicate how much overall pain on average you have had during the past 24 hours." The subjects responded to the question on a VAS scale (0-100), the lower figures on the scale indicating less amount of global pain experienced.

Patient Global Assessment of Disease Activity

The subjects assessed their current global status of symptomatic knee OA by means of a VAS ("Considering all the ways your knee osteoarthritis affects you, please indicate by tapping on the line, on average, how have you been doing during the last 24 hours?").

Exploratory Biomarkers

In order to assess biomarkers of osteoarthritis, blood samples to determine the serum levels of MMPs, ADAMTS-4, ADAMTS-5, and huARGS were collected and analyzed. Urine samples to determine the fasting urinary levels of CTX I and CTX II were also collected.

Pharmacokinetic Assessments

Sampling for pharmacokinetics (DMPC and DPPC) took place at selected sites. Subjects underwent additional blood draws for pharmacokinetic measurements at the following time points: pre-IP (baseline) and post-IP administration at 4 hours, 2 days, and 7 days. DPPC and DMPC concentrations in human plasma were quantified using a validated LC-MS/MS method.

Safety Assessments:

Adverse events (AEs) were determined using laboratory assessments which included laboratory measurements for blood chemistry, hematology and urinalysis; electrocardiogram assessments which included computerized 12-lead ECG recordings; physical examination; and vital signs. Any relevant observations made at the screening and baseline visit (including screening laboratory test results, and until the single dose of IP) were recorded on the AE eCRF, but were not considered treatment-emergent AEs (TEAEs) and were reported separately from TEAEs. Any relevant observations following the single dose of IP were recorded as an AE in the subject's AE eCRF. An AE relating to a pre-existing condition was only recorded if there was a worsening of the pre-existing condition during study conduct with regard to its nature, severity or frequency. The severity of an AE was characterized as: Mild—if the AE was easily tolerated; Moderate—if the AE was sufficiently discomforting to interfere with daily activity; Severe—if the AE prevented normal daily activities; Life-threatening—if the subject was at risk of death due to the AE as it occurred; and Death—as a death related to AE.

Figure 2:
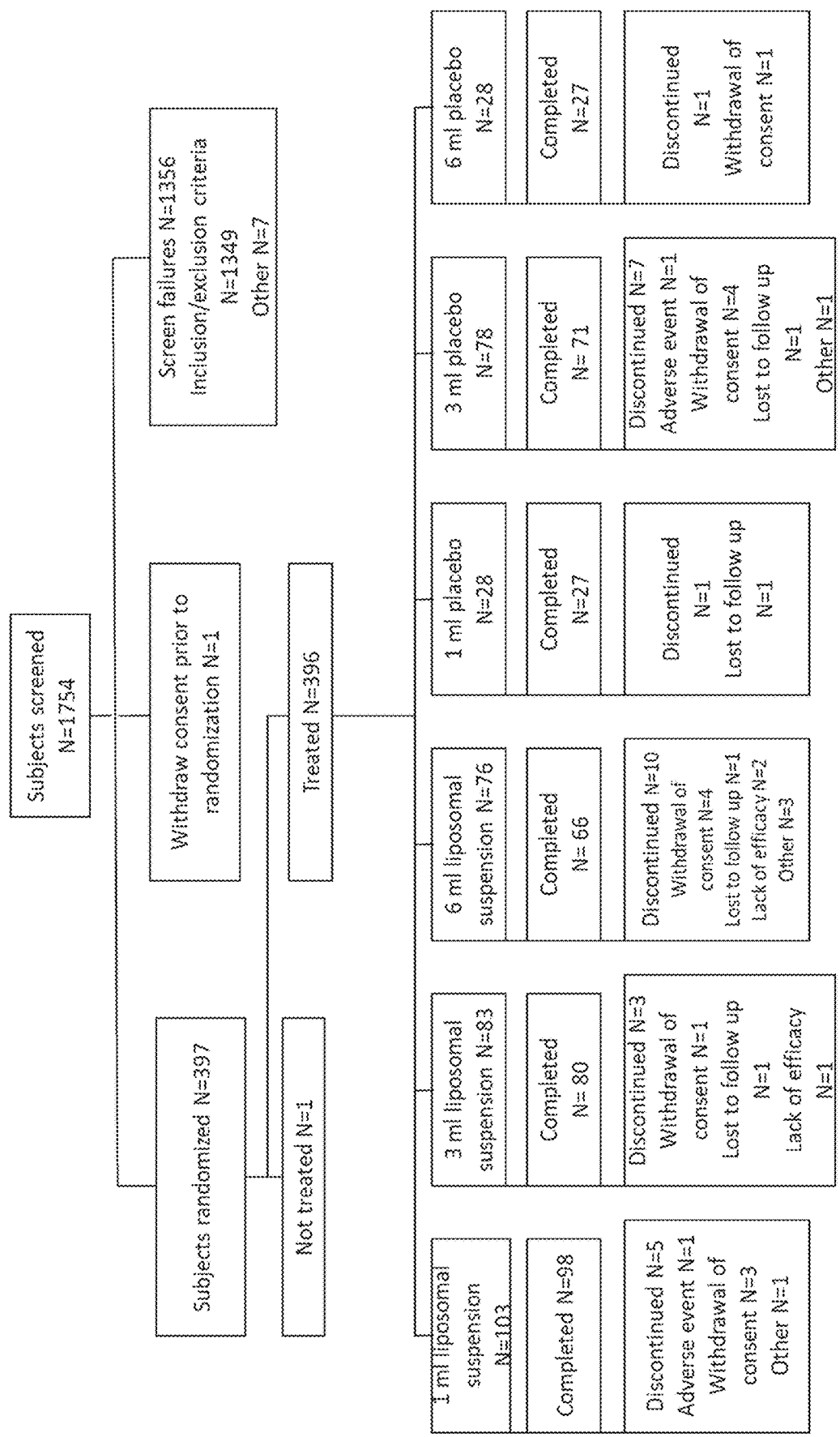
FIG. 2 shows the disposition of subjects enrolled in the study.

Results:

Similarity across the 6 study arms was observed. Discontinuation rates were low and similar across arms. The 6 mL arm of the liposomal suspension (Arm C) and the 3 mL arm of the placebo (Arm E) showed relatively high discontinuation rates. However, the discontinuations were not due to AE. FIG. 2 presents the subject disposition where treated subjects are presented according to their randomized treatment, and N denotes the number of subjects. Table 1 shows the baseline disease characteristics. Groups were comparable for baseline disease parameters. For WOMAC A pain score, most arms had higher number of subjects in ≤2.40 score group, except Arms C and F which had almost equal distribution of WOMAC pain groups.

TABLE 1

| | ARM A (N = 103) | ARM B (N = 83) | ARM C (N = 76) | ARM D (N = 28) | ARM E (N = 79) | ARM F (N = 28) |
|---|---|---|---|---|---|---|
| Baseline WOMAC A Pain Score. Mean (SD) | | | | | | |
| | 2.48 (0.387) | 2.43 (0.331) | 2.52 (0.387) | 2.49 (0.355) | 2.34 (0.353) | 2.54 (0.369) |
| WOMAC A Pain Score Group (%) | | | | | | |
| ≤2.40 | 57.3 | 65.1 | 47.4 | 60.7 | 73.1 | 46.4 |
| >2.40 | 42.7 | 34.9 | 52.6 | 39.3 | 26.9 | 53.6 |
| Baseline WOMAC B Stiffness Score. Mean (SD) | | | | | | |
| | 2.40 (0.634) | 2.24 (0.664) | 2.32 (0.827) | 2.36 (0.606) | 2.31 (0.731) | 2.36 (0.678) |
| Baseline WOMAC C Disability Score. Mean (SD) | | | | | | |
| | 2.33 (0.478) | 2.19 (0.578) | 2.29 (0.598) | 2.33 (0.409) | 2.21 (0.509) | 2.38 (0.491) |
| Baseline VAS Index Knee Pain. Mean (SD) | | | | | | |
| | 70.5 (9.63) | 69.1 (9.76) | 68.9 (10.80) | 67.5 (9.61) | 68.0 (10.37) | 68.0 (10.03) |
| VAS Index Knee Pain Group (%) | | | | | | |
| ≤74 | 60.2 | 67.5 | 67.1 | 71.4 | 68.4 | 67.9 |
| ≥75 | 39.8 | 32.5 | 32.9 | 28.6 | 31.6 | 32.1 |

Figure 3:
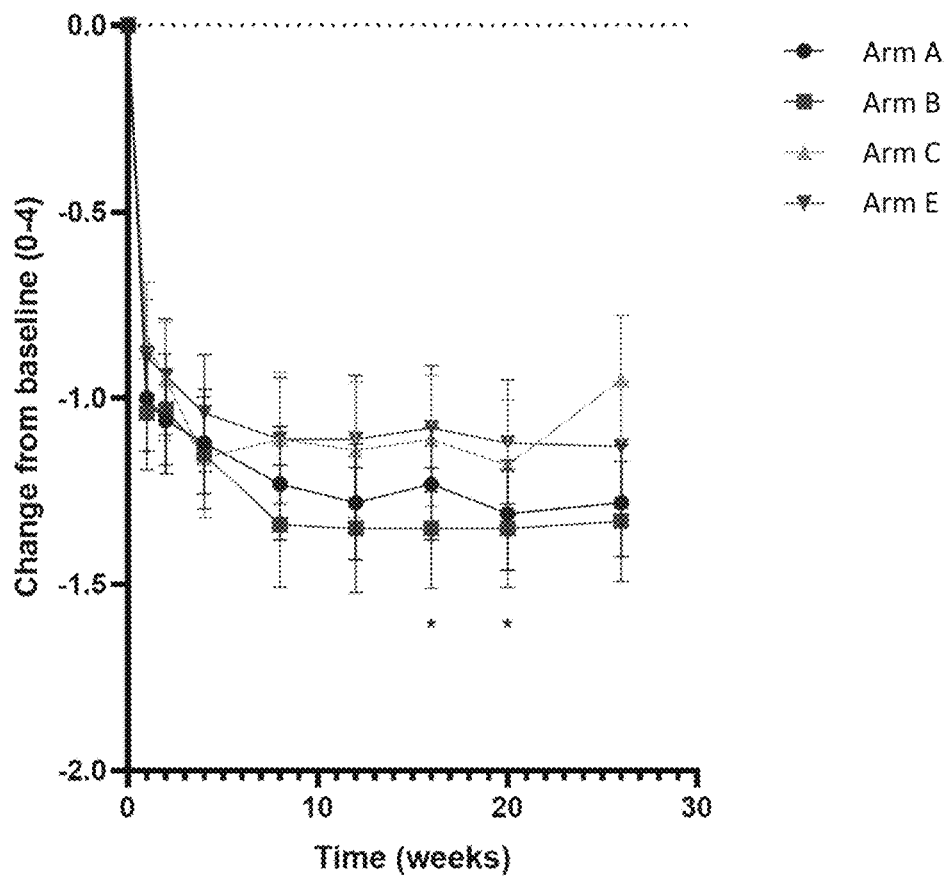
FIG. 3 shows the WOMAC A pain results over 26 weeks of study. *: $p<0.05$ unadjusted for multiplicity.

Table 2 shows the analysis of change from baseline to week 12 in WOMAC A (Pain). Unadjusted p-value showed statistically significant reduction in Arm B (3 mL of the liposomal suspension) vs. placebo (FIG. 3).

TABLE 2

|  | ARM A (N = 103) | ARM B (N = 83) | ARM C (N = 76) | ARM D (N = 28) | ARM E (N = 79) | ARM F (N = 28) |
| --- | --- | --- | --- | --- | --- | --- |
| n | 99 | 77 | 66 | 28 | 72 | 28 |
| LS Mean (SE) | −1.28 (0.079) | −1.35 (0.086) | −1.14 (0.092) | −0.96 (0.143) | −1.11 (0.089) | −1.10 (0.142) |
| LS Mean Difference (SE) | −0.16 (0.115) | −0.24 (0.120) | −0.02 (0.125) | | | |
| Unadjusted P-value | 0.152 | 0.047 | 0.850 | | | |
| Multiplicity Adjusted P-value | 0.850 | 0.085 | 0.850 | | | |

Figure 4:
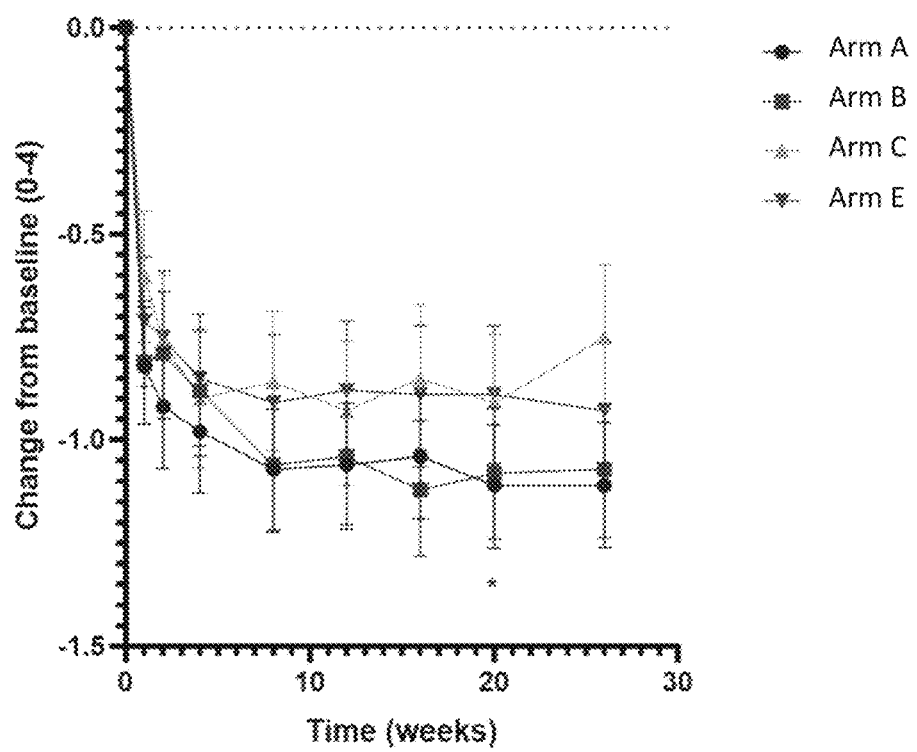
FIG. 4 shows the WOMAC C physical function over 26 weeks of study.

Table 3 shows the analysis of change from baseline to weeks 12 and 26 in WOMAC C (Physical Function). While no statistically significant difference between any active and placebo groups was noted, very slight numerical differentiation between Arms A and B (1 & 3 mL of the liposomal suspension) was observed (FIG. 4).

TABLE 3

|  | ARM A (N = 103) | ARM B (N = 83) | ARM C (N = 76) | ARM D (N = 28) | ARM E (N = 79) | ARM F (N = 28) |
| --- | --- | --- | --- | --- | --- | --- |
| | | | Week 12 | | | |
| n | 99 | 77 | 66 | 28 | 72 | 28 |
| LS Mean (SE) | −1.06 (0.077) | −1.04 (0.083) | −0.93 (0.089) | −0.74 (0.140) | −0.88 (0.087) | −0.91 (0.139) |
| LS Mean Difference (SE) | −0.18 (0.111) | −0.16 (0.117) | −0.05 (0.120) | | | |
| P-value | 0.100 | 0.171 | 0.661 | | | |
| | | | Week 26 | | | |
| n | 98 | 79 | 66 | 27 | 71 | 27 |
| LS Mean (SE) | −1.11 (0.077) | −1.07 (0.083) | −0.75 (0.089) | −1.10 (0.140) | −0.93 (0.087) | −0.96 (0.139) |
| LS Mean Difference (SE) | −0.18 (0.111) | −0.14 (0.116) | 0.18 (0.121) | | | |
| P-value | 0.110 | 0.221 | 0.131 | | | |

Figure 5:
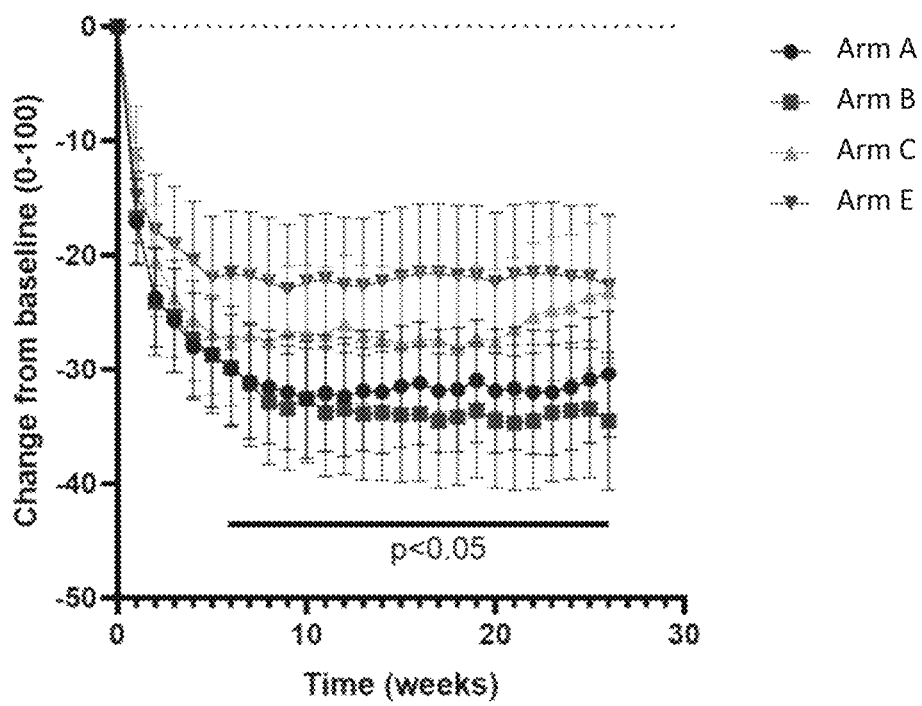
FIG. 5 shows the weekly average of daily knee pain over 26 weeks of study.

Table 4 shows the analysis of change from baseline over time in weekly average daily knee pain score. Very slight numerical differentiation between Arms A and B was noted. However, both arms containing 1 mL and 3 mL of the liposomal suspension showed statistically significant reductions early on (stating at week 6) which maintained consistently over time until week 25. At week 26, only Arm B showed statistically significant reductions (FIG. 5).

TABLE 4

|  | ARM A (N = 103) | ARM B (N = 83) | ARM C (N = 76) | ARM D (N = 28) | ARM E (N = 79) | ARM F (N = 28) |
| --- | --- | --- | --- | --- | --- | --- |
| | | | Week 12 | | | |
| LS Mean (SE) | −32.4 (2.65) | −33.5 (2.91) | −26.0 (3.05) | −24.3 (4.88) | 22.6 (3.01) | −25.4 (4.84) |
| LS Mean Difference (SE) | −9.8 (3.88) | 10.9 (4.08) | −3.4 (4.18) | | | |
| P-value | 0.012 | 0.008 | 0.418 | | | |

TABLE 4-continued

|  | ARM A (N = 103) | ARM B (N = 83) | ARM C (N = 76) | ARM D (N = 28) | ARM E (N = 79) | ARM F (N = 28) |
| --- | --- | --- | --- | --- | --- | --- |
| Week 26 | | | | | | |
| LS Mean (SE) | −30.4 (2.81) | −34.5 (3.08) | −23.1 (3.26) | −28.2 (5.19) | −22.7 (3.20) | −30.0 (5.15) |
| LS Mean Difference (SE) | −7.7 (4.13) | −11.8 (4.34) | −0.4 (4.47) | | | |
| P-value | 0.062 | 0.007 | 0.936 | | | |

Figure 6:
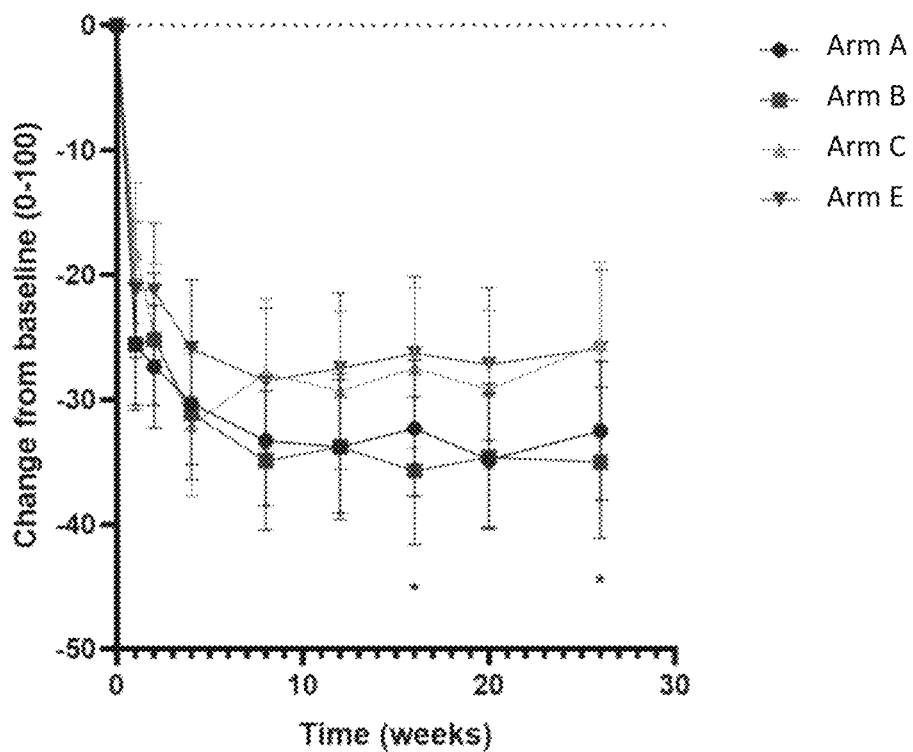
FIG. 6 shows the patient global assessment of disease activity over 26 weeks of study.

Table 5 shows the analysis of change from baseline to weeks 12 and 26 in patient global assessment of disease activity. While no statistically significant reduction was noted in any of the active arms at week 12, at week 26 Arm B containing 3 mL of the liposomal suspension showed a statistically significant reduction (FIG. 6).

TABLE 5

|  | ARM A (N = 103) | ARM B (N = 83) | ARM C (N = 76) | ARM D (N = 28) | ARM E (N = 79) | ARM F (N = 28) |
| --- | --- | --- | --- | --- | --- | --- |
| Week 12 | | | | | | |
| n | 99 | 77 | 64 | 28 | 71 | 27 |
| LS Mean (SE) | 33.8 (2.71) | 33.8 (2.95) | −29.3 (3.20) | −24.0 (4.95) | −27.5 (3.09) | −27.3 (4.93) |
| LS Mean Difference (SE) | −6.2 (3.94) | −6.3 (4.14) | −1.8 (4.30) | | | |
| P-value | 0.115 | 0.132 | 0.682 | | | |
| Week 26 | | | | | | |
| n | 98 | 79 | 65 | 27 | 70 | 27 |
| LS Mean (SE) | −32.5 (2.83) | −35.0 (3.07) | −25.5 (3.35) | −32.3 (5.20) | −25.9 (3.24) | −31.0 (5.15) |
| LS Mean Difference (SE) | −6.6 (4.14) | −9.1 (4.34) | 0.4 (4.52) | | | |
| P-value | 0.114 | 0.037 | 0.923 | | | |

Figure 7:
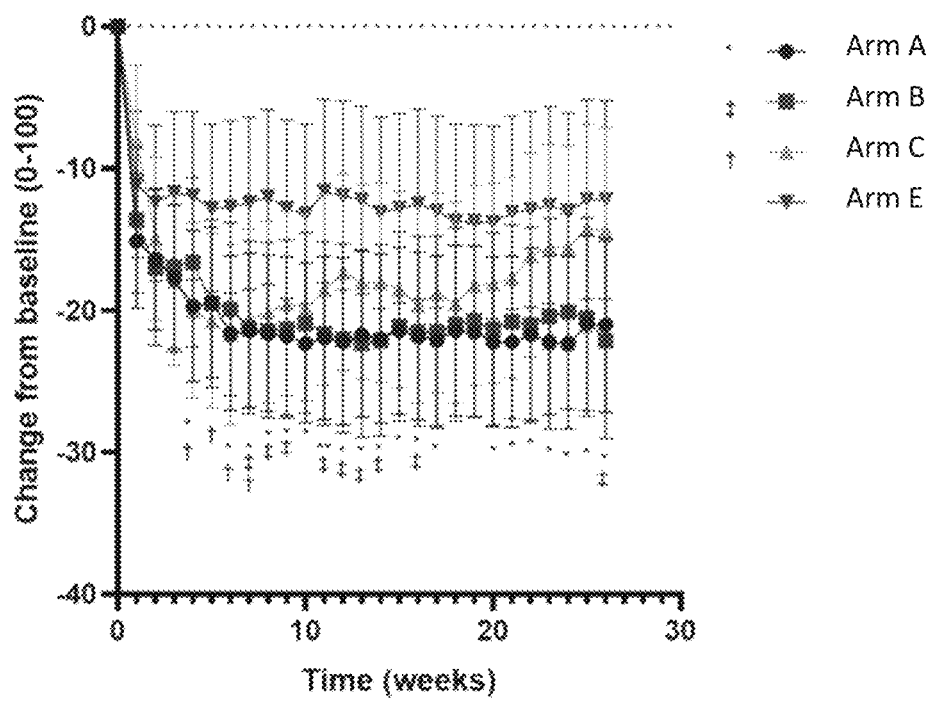
FIG. 7 shows the weekly average of daily global pain over 26 weeks of study.

The weekly average of global pain showed a robust benefit to Arms A and B vs. the placebo (FIG. 7).

Figure 8:
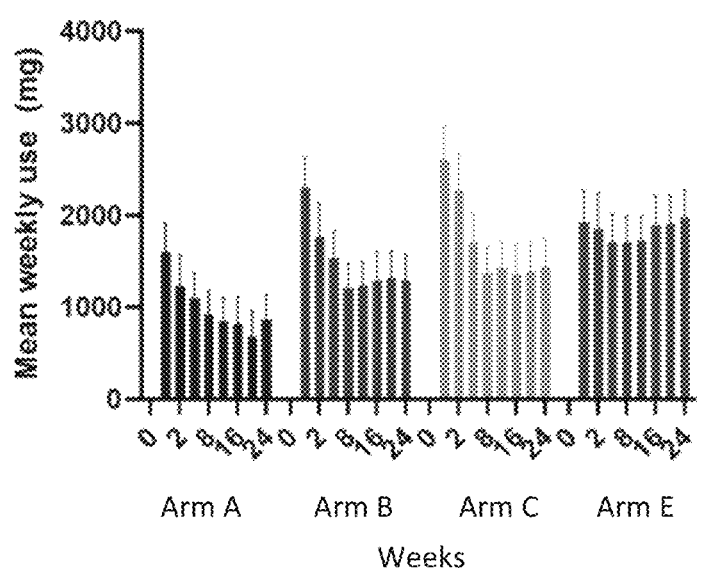
FIG. 8 shows the weekly cumulative amount (mg) of rescue medication used over 26 weeks of study.

Table 6 shows the analysis of change from baseline to weeks 12 and 26 in weekly cumulative amount (mg) of rescue medication use. Both 1 mL and 3 mL liposome groups showed an overall trend toward lower rescue medication use. This reduction was greater in Arm A (1 mL group) which, at weeks 12 and 26, met statistical significance. Further, this arm showed statistically significant reductions early on, from week 8, which was consistently maintained over time until week 26 (FIG. 8).

TABLE 6

|  | ARM A (N = 103) | ARM B (N = 83) | ARM C (N = 76) | ARM D (N = 28) | ARM E (N = 79) | ARM F (N = 28) |
| --- | --- | --- | --- | --- | --- | --- |
| Week 12 | | | | | | |
| n | 97 | 77 | 65 | 28 | 71 | 28 |
| LS Mean (SE) | 851.2 (245.99) | 1238.6 (261.99) | 1443.5 (281.74) | 687.5 (439.98) | 1729.2 (276.92) | 1318.4 (434.50) |
| LS Mean Difference (SE) | −878.0 (348.82) | −490.6 (365.12) | 285.7 (377.47) | | | |
| P-value | 0.012 | 0.180 | 0.450 | | | |

TABLE 6-continued

|  | ARM A (N = 103) | ARM B (N = 83) | ARM C (N = 76) | ARM D (N = 28) | ARM E (N = 79) | ARM F (N = 28) |
| --- | --- | --- | --- | --- | --- | --- |
| | | | Week 26 | | | |
| n | 97 | 76 | 63 | 25 | 71 | 23 |
| LS Mean (SE) | 867.2 (264.14) | 1290.4 (284.69) | 1450.0 (308.70) | 1168.7 (485.34) | 1976.6 (299.51) | 1760.5 (486.51) |
| LS Mean Difference (SE) | −1109.4 (379.37) | −686.2 (397.91) | −526.7 (413.63) | | | |
| P-value | 0.004 | 0.085 | 0.204 | | | |

Table 7 shows the safety summary. Incidence of AEs and discontinuations due to AEs were similar across arms. Incidence of study drug-related AEs were higher in the 6 mL active and placebo arms (Arms C and F, respectively). Incidence of study procedure-related AEs were higher in Arms B and C. No treatment-emergent deaths or AESI were reported. Incidence of SAE were low and similar across arms—none were considered related to the study drug. Most AEs were of mild to moderate intensity.

TABLE 7

|  | ARM A (N = 103) n (%) | ARM B (N = 83) n (%) | ARM C (N = 76) n (%) | ARM D (N = 28) n (%) | ARM E (N = 79) n (%) | ARM F (N = 28) n (%) |
| --- | --- | --- | --- | --- | --- | --- |
| Subjects with at least one TEAE | 75 (73.5) | 49 (57.0) | 49 (66.2) | 15 (53.6) | 46 (59.0) | 19 (67.9) |
| Subjects discontinued due to TEAE | 1 (1.0) | 0 (0) | 0 (0) | 0 (0) | 1 (1.3) | 0 (0) |
| Subjects with Study Drug Related TEAE | 3 (2.9) | 2 (2.3) | 4 (5.4) | 1 (3.6) | 1 (1.3) | 2 (7.1) |
| Subjects with Study Procedure Related TEAE | 1 (1.0) | 6 (7.0) | 7 (9.5) | 1 (3.6) | 1 (1.3) | 1 (3.6) |
| Subjects with Injection Site TEAE | 1 (1.0) | 3 (3.5) | 1 (1.4) | 2 (7.1) | 2 (2.6) | 0 (0) |
| Subjects with SAE | 4 (3.9) | 0 (0) | 3 (4.1) | 0 (0) | 3 (3.8) | 1 (3.6) |
| Subjects with Severe TEAE | 4 (3.9) | 0 (0) | 2 (2.7) | 0 (0) | 2 (2.6) | 1 (3.6) |

Figure 9:
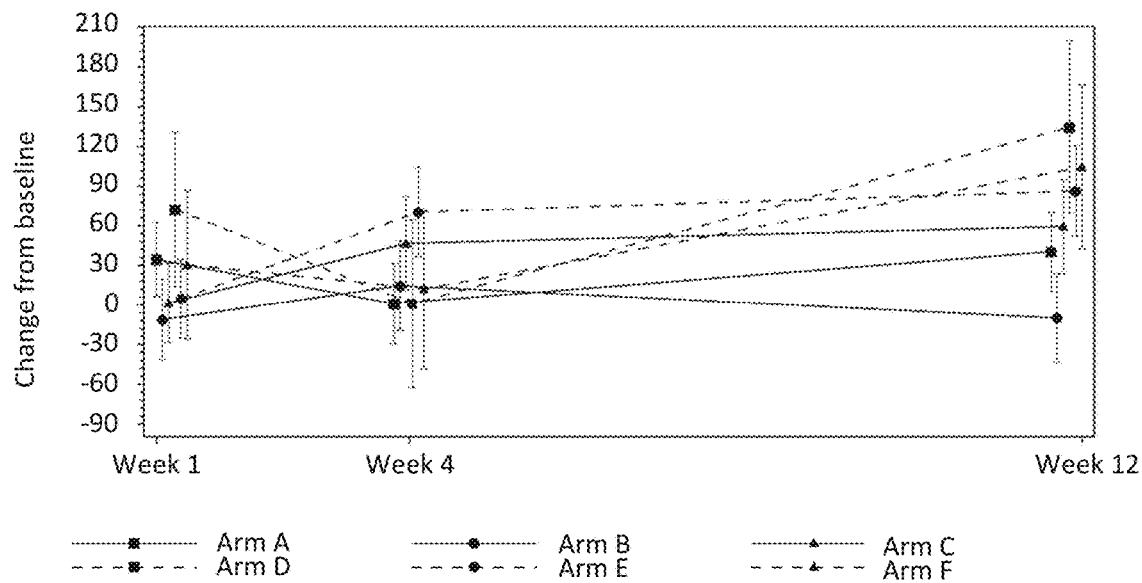
FIG. 9 shows the change from baseline in urinary C-terminal crosslinking telopeptide of collagen (CTX) Type II (µg/mol) vs. time over 12 weeks of study.

FIG. 9 shows the change in urinal biomarker CTX-00. The reduction in CTX-observed for Arm B indicates a reduction in disease severity.

The liposomal suspension of the present invention was compared to the published efficacy data of Zilretta® which is an extended-release corticosteroid composition approved for the treatment of osteoarthritis knee pain. Tables 8 and 9 show the change from baseline to week 12 in WOMAC A (Pain) and WOMAC C (Physical Function), respectively. Reduction from baseline was higher using the liposomal suspension compared to Zilretta®. However, a higher score reduction in the placebo arm of the liposomal composition as compared to Zilretta® was observed.

TABLE 8

|  | Liposomal composition (P2) | | Zilretta-008 (P3) | |
| --- | --- | --- | --- | --- |
|  | Arm B | Arm E | Zilretta ® | placebo |
| Baseline Mean Score (SD) | 2.43 (0.331) | 2.34 (0.353) | 2.0 (0.530) | 2.0 (0.520) |
| LS Mean Change from BL (SE) | −1.35 (0.086) | −1.11 (0.089) | −0.88 (0.071) | −0.50 (0.071) |
| LS Mean Difference | −0.24 | | −0.37 | |

TABLE 9

|  | Liposomal composition (P2) | | Zilretta-008 (P3) | |
| --- | --- | --- | --- | --- |
|  | Arm B | Arm E | Zilretta ® | placebo |
| Baseline Mean Score (SD) | 2.19 (0.578) | 2.21 (0.509) | 2.1 (0.56) | 2.1 (0.51) |
| LS Mean Change from BL (SE) | −1.04 (0.083) | −0.88 (0.087) | −0.93 (0.069) | −0.56 (0.068) |
| LS Mean Difference | −0.16 | | −0.38 | |

There were no meaningful changes in any of the biomarkers evaluated, except for the change from baseline in urinary CTX II levels, where a trend towards a decrease was noted over time for the 3 mL liposome arm compared to placebo, which reached statistical significance at week 12 (P=0.041).

Table 10 shows the absolute number and the percentage of subjects with a decrease in WOMAC A pain score of ≥30% and ≥50%. The ≥30% responder rate was observed to be higher for Arm A compared to Arm E at weeks 12, 16, and 20 (P<0.05) and for Arm B compared to Arm E at weeks 8 and 20 (P<0.05). The ≥50% responder rate was observed to be higher for Arm A compared to Arm E at weeks 1, 8, 16, 20, and 26 (P<0.05), for Arm B compared to Arm E at weeks 8, 16, 20, and 26 (P<0.05), and for Arm C compared to Arm E at weeks 1, 2, and 4 (P<0.05). Thus, a trend was observed for the ≥50% responder rate with both 1 mL and 3 mL of the liposomal suspension of the present invention showing a higher responder rate than treatment with 3 mL placebo, starting from week 8 and persisting through week 26. These numbers were numerically higher for the 3 mL arm compared to the 1 mL arm of the liposomal suspension of the present invention at most time points.

TABLE 10

|  | ARM A (N = 103) n (%) | ARM B (N = 83) n (%) | ARM C (N = 76) n (%) | ARM D (N = 28) n (%) | ARM E (N = 78) n (%) | ARM F (N = 28) n (%) |
| --- | --- | --- | --- | --- | --- | --- |
| ≥30% improvement | | | | | | |
| Week 1 | 55 (55.0) | 46 (56.1) | 39 (52.7) | 13 (46.4) | 39 (50.0) | 16 (59.3) |
| P-value* | 0.272 | 0.573 | 0.429 | | | |
| Week 2 | 64 (62.7) | 43 (53.1) | 42 (57.5) | 15 (53.6) | 43 (57.3) | 20 (71.4) |
| P-value* | 0.153 | 0.484 | 0.320 | | | |
| Week 4 | 70 (69.3) | 55 (68.8) | 47 (68.1) | 21 (75.0) | 47 (62.7) | 17 (60.7) |
| P-value* | 0.185 | 0.497 | 0.316 | | | |
| Week 8 | 70 (71.4) | 61 (77.2) | 44 (63.8) | 16 (57.1) | 46 (62.2) | 20 (71.4) |
| P-value* | 0.138 | 0.048 | 0.649 | | | |
| Week 12 | 75 (75.8) | 56 (72.7) | 42 (63.6) | 18 (64.3) | 43 (59.7) | 19 (67.9) |
| P-value* | 0.014 | 0.146 | 0.605 | | | |
| Week 16 | 73 (74.5) | 54 (70.1) | 45 (68.2) | 19 (70.4) | 42 (59.2) | 23 (82.1) |
| P-value* | 0.034 | 0.287 | 0.210 | | | |
| Week 20 | 79 (81.4) | 61 (77.2) | 46 (69.7) | 20 (74.1) | 44 (61.1) | 18 (64.3) |
| P-value* | 0.002 | 0.036 | 0.261 | | | |
| Week 26 | 71 (72.4) | 61 (77.2) | 38 (57.6) | 17 (63.0) | 45 (63.4) | 18 (66.7) |
| P-value | 0.179 | 0.056 | 0.634 | | | |
| ≥50% improvement | | | | | | |
| Week 1 | 35 (35.0) | 30 (36.6) | 26 (35.1) | 5 (17.9) | 18 (23.1) | 8 (29.6) |
| P-value* | 0.033 | 0.084 | 0.023 | | | |
| Week 2 | 34 (33.3) | 30 (37.0) | 27 (37.0) | 7 (25.0) | 18 (24.0) | 12 (42.9) |
| P-value* | 0.093 | 0.080 | 0.021 | | | |
| Week 4 | 41 (40.6) | 35 (43.8) | 32 (46.4) | 14 (50.0) | 23 (30.7) | 12 (42.9) |
| P-value* | 0.062 | 0.184 | 0.024 | | | |
| Week 8 | 49 (50.0) | 43 (54.4) | 29 (42.0) | 9 (32.1) | 25 (33.8) | 15 (53.6) |
| P-value* | 0.023 | 0.014 | 0.238 | | | |
| Week 12 | 51 (51.5) | 44 (57.1) | 32 (48.5) | 11 (39.3) | 30 (41.7) | 14 (50.0) |
| P-value* | 0.212 | 0.159 | 0.354 | | | |
| Week 16 | 52 (53.1) | 47 (61.0) | 30 (45.5) | 14 (51.9) | 23 (32.4) | 13 (46.4) |
| P-value* | 0.012 | 0.002 | 0.134 | | | |
| Week 20 | 56 (57.7) | 46 (58.2) | 31 (47.0) | 15 (55.6) | 28 (38.9) | 12 (42.9) |
| P-value* | 0.017 | 0.048 | 0.278 | | | |
| Week 26 | 55 (56.1) | 44 (55.7) | 25 (37.9) | 13 (48.1) | 27 (38.0) | 13 (48.1) |
| P-value | 0.020 | 0.044 | 0.794 | | | |

*Comparison against 3 mL placebo.

Figure 10A:
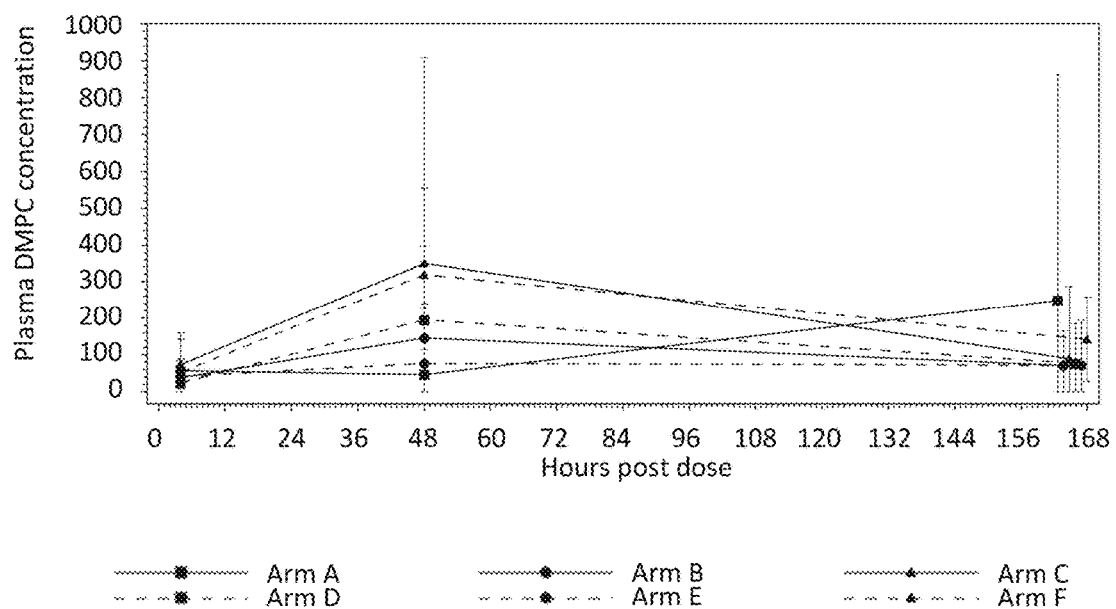
FIG. 10A shows the mean baseline-adjusted plasma DMPC concentrations (ng/mL).
Figure 10B:
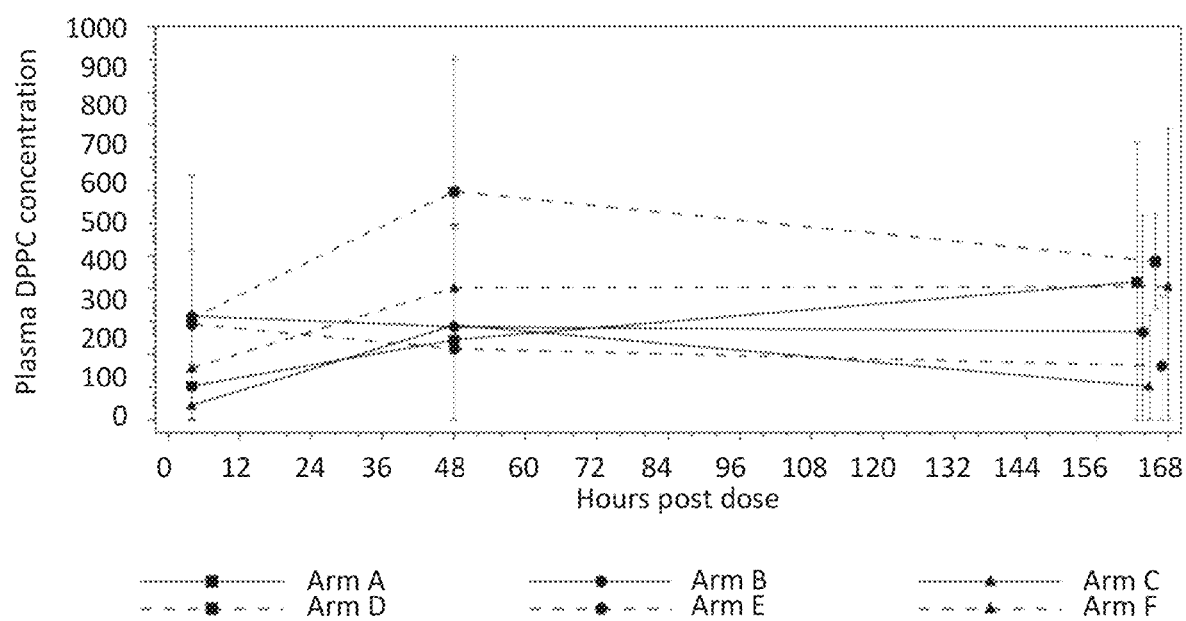
FIG. 10B shows the mean baseline-adjusted plasma DPPC concentrations (ng/mL).

FIGS. 10A-10B show the mean baseline-adjusted plasma DMPC and DPPC concentrations until 168 hours post-IP administration based on the modified pharmacokinetic analysis. Quantifiable levels of DMPC and DPPC were observed in pre-dose samples suggesting that DMPC and DPPC are endogenous in the systemic circulation. There were no considerable changes in plasma DMPC and DPPC concentrations from pre-dose to post-dose time points. Furthermore, the baseline-adjusted concentrations and exposures of DMPC and DPPC appeared to be comparable between the liposomal suspensions of the present invention (Arms A-C) and corresponding placebo groups (Arms D-F).

In summary, there was a trend towards reduction in WOMAC A pain score for both Arms A and B vs. Arm E, with Arm B showing a numerically higher reduction. Multiplicity-unadjusted P-values for the comparison against Arm E, at week 12 were: Arm B (P=0.047) and Arm A (P=0.152). A sensitivity analysis of the primary efficacy endpoint based on the FAS and pooling Arms D, E, and F, showed numerically lower baseline-adjusted WOMAC A pain score at week 12 for Arm B vs. Arm E: −0.28 (−0.484, −0.068), P=0.018 (multiplicity-adjusted), P=0.009 (unadjusted).

For the change in WOMAC A pain score over time, both Arms A and B showed a trend towards reduction vs. Arm E. Estimated treatment differences for Arm B vs. Arm E were −0.27 (−0.494, −0.039), P=0.022 at week 16, and −0.23 (−0.454, −0.009), P=0.041 at week 20 (multiplicity-unadjusted P-values). Further, a numerical reduction for Arm B vs. Arm E was also observed at week 8 and persisted through weeks 12, 16 and 20 (P=0.055, P=0.051, P=0.022, and P=0.041, respectively). The reductions for Arms A and C were numerically lower than those for Arm B, and no differences were observed for Arm C vs. Arm E.

Change from baseline in WOMAC B stiffness score did not differ between Arms A, B, C, and E, at any of the time points, except for a worsening (i.e., increase) of the score for Arm C vs. Arm E, at week 26 [0.28 (0.028, 0.535), P=0.030].

For the change from baseline in WOMAC C disability score, a trend towards reduction was noted for both Arms A and B vs. Arm E. A numerically greater improvement (i.e., reduction) in the score was observed for Arm A vs. Arm E, at week 20 [−0.22 (−0.437, −0.010), P=0.040].

For the change from baseline in weekly average of daily knee pain VAS score, both Arms A and B showed an early and sustained trend towards reduction over time vs. Arm E. Reductions for Arm A vs. Arm E were observed at week 3 and week 4 as well as from week 6 through week 25 [week 25: −9.1 (−17.16, −1.02), P=0.027]. Reductions for Arm B vs. Arm E were observed from week 6 through week 26 [week 26: −11.8 (−20.35, −3.27), P=0.007]. The magnitude of these reductions was numerically higher for Arm B vs. Arm A at most time points.

For the change from baseline in the weekly average of daily global pain VAS score, there was a trend towards reduction for both Arms A and B vs. Arm E over time. Reductions for Arm A vs. Arm E were observed at week 4, from week 6 to week 17, and from week 20 through week 26 [week 26: −8.8 (−17.37, −0.30), P=0.042]. Reductions for Arm B vs. Arm E were observed during weeks 7 to 9, 11 to 14, 16, and 26 [week 26: −9.9 (−19.12, −0.62), P=0.037]. Reductions were observed for Arm C vs. Arm E from week 4 to week 7 [week 7: −8.2 (−16.14, −0.16), P=0.046].

For the change from baseline in PtGA, both Arms A and B showed trends towards reduction vs. Arm E. Estimated treatment differences for Arm B vs. Arm E were −9.4 (−17.72, −1.08), P=0.027 at week 16 and −9.1 (−17.63, −0.57), P=0.037 at week 26.

A trend towards reduction in WOMAC C disability score was noted for Arms A, B, and C vs. Arm E from week 8 onwards.

In weekly cumulative amount of rescue medication use, Arms A, B and C showed trends towards lower values vs. Arm E. The greatest observed difference was for Arm A vs. Arm E from week 8 onwards [week 26: −1109.4 mg (−1855.37, −363.48), P=0.004].

Change from baseline in MMP-1, MMP-2, MMP-9, ADAMTS-4, ADAMTS-5, huARGS, and urinary CTX I concentrations did not differ in Arms A, B and C, vs. Arm E, at any of the time points (weeks 1, 2, and 4). Except for: (1) an observed decrease in MMP-9 for Arm A at week 2 that was different from the increase seen for Arm E [−41.90 [μg/L (−79.065, −4.735), P=0.027]; (2) an observed increase in ADAMTS-4 for Arm B at week 1 that was different from the decrease seen for Arm E [895.4 pmol/mL (21.33, 1769.56), P=0.045]; and (3) an observed decrease in CTX I for Arm B at week 4 that was different from the increase seen for Arm E [−0.115 mg/mol (−0.2135, −0.0172), P=0.021].

For the change from baseline in urinary CTX II levels, a trend towards a decrease was noted over time for Arm B vs. Arm E, with an observed difference at week 12 of −96.1 mg/mol (−188.40, −3.89), P=0.041.

The ≥30% responder rate was observed to be higher for Arm A vs. Arm E, at week 12 (75.8% vs. 59.7%, P=0.014), week 16 (74.5% vs. 59.2%, P=0.034), and week 20 (81.4% vs. 61.1%, P=0.002), and for Arm B vs. Arm E, at week 8 (77.2% vs. 62.2%, P=0.048) and week 20 (77.2% vs. 61.1%, P=0.036).

For the ≥50% responder rate, a trend was observed with both Arms A and B showing higher responder rate vs. Arm E, starting from week 8 and persisting through week 26. These numbers were numerically higher for Arm B vs. Arm A at most time points. The rate for Arm A vs. Arm E was observed to be higher at: week 1 (35.0% vs. 23.1%, P=0.033), week 8 (50.0% vs. 33.8%, P=0.023), week 16 (53.1% vs. 32.4%, P=0.012), week 20 (57.7% vs. 38.9%, P=0.017), and week 26 (56.1% vs. 38.0%, P=0.020). The rate for Arm B vs. Arm E was observed to be higher at: week 8 (54.4% vs. 33.8%, P=0.014), week 16 (61.0% vs. 32.4%, P=0.002), week 20 (58.2% vs. 38.9%, P=0.048), and week 26 (55.7% vs. 38.0%, P=0.044). The rate for Arm C vs. Arm E was observed to be higher at: week 1 (35.1% vs. 23.1%, P=0.023), week 2 (37.0% vs. 24.0%, P=0.021), and week 4 (46.4% vs. 30.7%, P=0.024).

Quantifiable levels of DMPC and DPPC were observed in pre-dose samples from all arms, suggesting that DMPC and DPPC are endogenous compounds in the systemic circulation. The baseline-adjusted pharmacokinetic parameters ($C_{max}$ and AUC) of DMPC and DPPC in Arms A, B and C treatment groups were comparable or lower than those for corresponding Arms D, E and F, suggesting there was no increase in systemic exposure of endogenous DMPC and DPPC levels upon intraarticular administration of the liposomes.

The liposomes were safe and well tolerated with no differences in safety assessments compared to placebo as assessed by Adverse Events (AEs), clinical laboratory assessments, vital signs, electrocardiogram, and physical examination. A total of 526 treatment-emergent AEs in 253 subjects were recorded during the study according to the following: 73.5% in Arm A, 57.0% in Arm B, 66.2% in Arm C, 53.6% in Arm D, 59.0% in Arm E, and 67.9% in Arm F.

The majority of AEs (>95%) were mild or moderate. A total of 15 treatment-emergent Severe Adverse Events (SAEs) in 11 subjects occurred during the study. Except for 2 SAEs of osteoarthritis in 2 subjects in the Arm E group, all SAEs were single patients within each treatment group. All SAEs were assessed to be unrelated to the study.

No clinically significant overall changes occurred in hematology, chemistry, lipids, urinalysis, vital signs, and electrocardiogram measurements. There were no observed differences between liposomes and control arms in clinically significant abnormalities among post-dose individual safety laboratory assessments. Few observations in physical examination were assessed as abnormal, and clinically significant, with no observed differences in frequency between liposomes and placebo groups.

Thus, in WOMAC A pain score (primary endpoint), no statistically significant difference in any active arm was measured using multiplicity adjusted p-value. However, when using unadjusted p-value, statistically significant reduction was measured when subjects were treated with 3 mL of the liposomal suspension. In WOMAC C disability score, no statistically significant difference in any active arm was observed.

Weekly average daily knee pain score showed statistically significant reductions early on (week 6) in both active arms containing 1 mL and 3 mL of the liposomal suspension. The reductions were maintained until week 25. A statistically significant reduction in patient's global assessment was seen with treatment of 3 mL of the liposomal suspension at week 26. All three dose levels of the liposomal composition showed a trend towards a decrease in the use of rescue medication, suggesting that subjects receiving treatment were in less pain. The use of rescue medication for 1 mL of the liposomal suspension was observed to be lower than 3 mL placebo from week 8 onwards (P<0.05). For the change from baseline in urinary CTX II, a trend towards a decrease was noted over time for the 3 mL liposome arm, with an observed difference at week 12 vs. the observed increase seen for 3 mL placebo (P=0.041). Pharmacokinetic results indicated that there was no increase in systemic exposure of endogenous DMPC and DPPC, upon IA injection of the liposomal suspension. Finally, the liposomal suspension was shown to be well-tolerated with similar incidence of AEs across arms, no treatment-emergent deaths, and no AE of special interest reported. Incidence of SAEs were low and similar across arms—none being related to the study drug.

Example 2—A Phase III. Randomized, Double-Blind, Placebo-Controlled Single Administration Study A phase III clinical trial is conducted in order to assess the safety and efficacy of a single administration of liposomes containing 46.1 mg/ml DMPC and 60.2 mg/ml DPPC at a concentration of 150 mM suspended in a liquid medium containing mannitol and a histidine buffer in subjects with symptomatic knee osteoarthritis (OA). As control, placebo samples containing the liquid medium with no liposomes is used.

Subjects Inclusion Criteria:
1. Men or women ≥40 years of age.
2. OA of index knee as per American College of Rheumatology (ACR) criteria (clinical and radiological).
3. Presence of Kellgren-Lawrence (K-L) Grade 2 or 3 disease in index knee.
4. Presence of index knee pain for at least 6 months prior to screening and for >15 days in the last month preceding screening.
5. Index knee WOMAC A pain score ≥2 at screening and baseline.
6. Index knee VAS pain score ≥50 mm and ≤90 mm in at least 5 out of the 7 days prior to baseline.
7. Ability and willingness to use only protocol-allowed rescue medication for OA knee pain throughout the study which includes acetaminophen/paracetamol at a maximal allowable dose of 4 g/per day, except during the last 24 h prior to a scheduled study efficacy assessment.
8. Discontinue oral non-steroidal anti-inflammatory drugs (NSAIDs) from the time of screening and during the study.
9. Discontinue topical therapies (e.g., NSAIDs, capsaicin, lidocaine patches etc.) applied to the index knee from the time of screening and during the study.
10. Abstain from any IA treatments/interventions in either knee during the study.

Primary Endpoint:
Change in weekly ADP score from baseline to week 12.

Secondary Endpoints:
Change in WOMAC A pain score from baseline to week 12.
In addition, other secondary endpoints include:
Change in weekly ADP score from baseline to weeks 4, 8, 16, 20, 26, 30, 38, 46, and 52.
Change in WOMAC A pain score from baseline to weeks 4, 8, 16, 20, 26 30, 38, 46, and 52.
Percentage of patients showing 30% and 50% improvement in weekly ADP score from baseline to weeks 4, 8, 12, 16, 20, 26, 30, 38, 46, and 52.
Percentage of patients showing 30% and 50% improvement in WOMAC A pain score from baseline to weeks 4, 8, 12, 16, 20, 26, 30, 38, 46, and 52.
Change in WOMAC B stiffness score from baseline to weeks 4, 8, 12, 16, 20, 26, 30, 38, 46, and 52.
Change in WOMAC C physical function score from baseline to weeks 4, 8, 12, 16, 20, 26, 30, 38, 46, and 52.
Change in PtGA of disease activity from baseline to weeks 4, 8, 12, 16, 20, 26, 30, 38, 46, and 52.
Change in the weekly cumulative amount of rescue medication use from baseline to weeks 4, 8, 12, 16, 20, 26, 30, 38, 46, and 52.

Safety Endpoints:
Safety and tolerability are assessed through medical history, physical examination (including vital signs), and clinical laboratory tests. Nature, frequency, and severity of adverse events (AEs), treatment-emergent adverse events (TEAEs), and serious adverse events (SAEs).

Exploratory Endpoints:
Change from baseline in urinary CTX-II over time.

Study Design and Statistics:
After screening, eligible subjects are randomized (2:1) to receive either 3 mL of the liposomal composition of the present invention or placebo on Day 1 (baseline) in their index knee. The primary efficacy evaluation is performed at week 12. The efficacy and safety are assessed through week 52 which denotes the End of Study (EoS).

Efficacy Assessments:
The primary analysis population constitutes the Full Analysis Set (FAS), including all randomized subjects who have received one dose of 3 mL of the liposomal composition of the present invention or placebo. Following the intent-to-treat principle, subjects are analyzed based on the treatments they were randomized to, irrespective of the actual treatments received.

WOMAC A, B and C scores are measured using 5-point Likert scales, weekly ADP scores are measured using 100 mm Visual Analogue Scale [VAS], and PtGA are measured using 100 mm VAS scale.

Example 3—A Phase III, Randomized, Double-Blind, Placebo-Controlled Repeated Administrations Study A phase III clinical trial is conducted in order to assess the safety and efficacy of repeated administrations of liposomes containing 46.1 mg/ml DMPC and 60.2 mg/ml DPPC at a concentration of 150 mM suspended in a liquid medium containing mannitol and a histidine buffer in subjects with symptomatic knee osteoarthritis (OA). As control, placebo samples containing the liquid medium with no liposomes is used.

Subjects Inclusion Criteria:
1. Men or women ≥40 years of age.
2. OA of index knee as per American College of Rheumatology (ACR) criteria (clinical and radiological).
3. Presence of Kellgren-Lawrence (K-L) Grade 2 or 3 disease in index knee.
4. Presence of index knee pain for at least 6 months prior to screening and for >15 days in the last month preceding screening.
5. Index knee WOMAC A pain score ≥2 at screening and baseline.
6. Index knee VAS pain score ≥50 mm and ≤90 mm in at least 5 out of the 7 days prior to baseline.
7. Ability and willingness to use only protocol-allowed rescue medication for OA knee pain throughout the study which includes acetaminophen/paracetamol at a maximal allowable dose of 4 g/per day, except during the last 24 h prior to a scheduled study efficacy assessment.
8. Discontinue oral non-steroidal anti-inflammatory drugs (NSAIDs) from the time of screening and during the study.
9. Discontinue topical therapies (e.g., NSAIDs, capsaicin, lidocaine patches etc.) applied to the index knee from the time of screening and during the study.
10. Abstain from any IA treatments/interventions in either knee during study.
11. In the case of physical therapy for OA, it must be stable for at least 4 weeks prior to IP administration and throughout the study.
12. In the case of treatment with oral glucosamine, chondroitin, or other nutraceuticals for OA, this must be stable for at least 4 weeks prior to IP administration and throughout study.

Primary Endpoint:
Change in weekly ADP score from baseline to week 12.

Secondary Endpoints:
Change in WOMAC A pain score from baseline to week 12.
In addition, other secondary endpoints include:
Change in weekly ADP score from baseline to weeks 4, 8, 16, 20, and 26 for the first dose administration and weeks 30, 38, 46, and 52 for the second dose administration.
Change in WOMAC A pain score from baseline to weeks 4, 8, 16, 20, and 26 for the first dose administration and weeks 30, 38, 46, and 52 for the second dose administration.
Percentage of patients showing 30% and 50% improvement in weekly ADP score from baseline to weeks 4, 8, 12, 16, 20, and 26 for the first administration and weeks 30, 38, 46, and 52 for the second dose administration.
Percentage of patients showing 30% and 50% improvement in WOMAC A pain score from baseline to weeks 4, 8, 12, 16, 20, and 26 for the first dose administration and weeks 30, 38, 46, and 52 for the second dose administration.
Change in WOMAC B stiffness score from baseline to weeks 4, 8, 12, 16, 20, and 26 for the first dose administration and weeks 30, 38, 46, and 52 for the second dose administration.
Change in WOMAC C physical function score from baseline to weeks 4, 8, 12, 16, 20, and 26 for the first dose administration and weeks 30, 38, 46, and 52 for the second dose administration.
Change in PtGA of disease activity from baseline to weeks 4, 8, 12, 16, 20, and 26 for the first dose administration and weeks 30, 38, 46, and 52 for the second dose administration.
Change in SF-36 from baseline to weeks 4, 8, 12, 16, 20, and 26 for the first dose administration and weeks 30, 38, 46, and 52 for the second dose administration.
Change in the weekly cumulative amount of rescue medication use from baseline to weeks 4, 8, 12, 16, 20, and 26 for the first dose administration and weeks 30, 38, 46, and 52 for the second dose administration.

Safety Endpoints:
Safety and tolerability are assessed through medical history, physical examination (including vital signs), and clinical laboratory tests. Nature, frequency, and severity of adverse events (AEs), treatment-emergent adverse events (TEAEs), and serious adverse events (SAEs).

Exploratory Endpoints:
Change from baseline in urinary CTX-II over time.

Study Design and Statistics:
After screening, eligible subjects are randomized (2:1) to receive (IA) intra articular injection of either 3 mL of the liposomal composition of the present invention or placebo on Day 1 (baseline, first dose) and at week 26 (as per original randomization, second dose) in their index knee. The primary efficacy evaluation is performed at week 12 and week 26. The efficacy and safety are assessed through week 52 which denotes the End of Study (EoS).

Example 4—Pharmacokinetic Study

A pK study is conducted in order to assess the systemic exposure to liposomes and characterize time-concentration curve in subjects with symptomatic knee OA following a single intra-articular (IA) knee joint injection of liposomes containing 46.1 mg/ml DMPC and 60.2 mg/ml DPPC at a concentration of 150 mM suspended in a liquid medium containing mannitol and a histidine buffer. As control, placebo samples containing the liquid medium with no liposomes is used.

Subjects Inclusion Criteria:
1. Presence of index knee pain for at least 6 months prior to screening and for >15 days in the last month preceding screening.

2. Discontinue oral or topical non-steroidal anti-inflammatory drugs (NSAIDs) 48 hours prior to the scheduled knee joint injection.
3. Index knee WOMAC A pain score ≥2 at screening and baseline.
4. Index knee VAS pain score ≥50 mm and ≤90 mm in at least 5 out of the 7 days prior to baseline.
5. Ability and willingness to use only protocol-allowed rescue medication for OA knee pain throughout the study which includes acetaminophen/paracetamol at a maximal allowable dose of 4 g/per day, except during the last 24 h prior to a scheduled study efficacy assessment.
6. Discontinue oral non-steroidal anti-inflammatory drugs (NSAIDs) from the time of screening and during the study.
7. Discontinue topical therapies (e.g., NSAIDs, capsaicin, lidocaine patches etc.) applied to the index knee prior to baseline.
8. Abstain from any IA treatments/interventions in any joints during study.

Primary Endpoint:

PK characteristics, such as systemic levels and $C_{max}$, in subjects with symptomatic knee OA following a single IA knee joint injection with the liposomes.

Secondary Endpoints:

Safety and tolerability for liposomes in subjects with symptomatic knee OA following a single IA knee joint injection with the liposomes.

Study Design and Statistics:

After screening, eligible subjects are randomized (2:1) to receive either 3 mL of the liposomal composition of the present invention or placebo on Day 1 (baseline) in their index knee.

Systemic exposure and PK measurements are performed at designated time points (baseline, post-dose at 1, 2, 3, 4, 6, 8, 12, 16, 24, 32, 36, 40, 44, 48, 72, and 168 hours). Assessments for PK measurements and safety are determined through Day 7 post-dose, which denotes the End of Study (EoS). On the day of injection, the subjects may receive pain medication through 8 hours post-IP injection.

While it is appreciated by persons skilled in the art that the present invention is not limited by what has been particularly shown and described hereinabove. Rather the scope of the present invention includes both combinations and sub-combinations of various features described hereinabove as well as variations and modifications. Therefore, the invention is not to be constructed as restricted to the particularly described embodiments, and the scope and concept of the invention will be more readily understood by references to the claims, which follow.

What is claimed is:

1. A method of treating a subject having an articular disorder, the method comprising administration of a single intra-articular injection of a liposomal composition comprising a phosphatidylcholine selected from the group consisting of 1,2-dimyristoyl-sn-glycero-3-phosphocholine, 1,2-dipalmitoyl-sn-glycero-3-phosphocholine, 1,2-dipentadecanoyl-sn-glycero-3-phosphocholine, 1,2-distearoyl-sn-glycero-3-phosphocholine, N-palmitoyl-D-erythrosphingosylphosphorylcholine, and a combination thereof, as the sole active ingredient every 4 to 12 months, wherein the method comprises a reduction in Western Ontario and McMaster Universities Osteoarthritis Index A pain score of at least 50% compared to a baseline or untreated control.

2. The method of claim 1, wherein the method comprises treating pain or irritation in a joint of the subject having an articular disorder.

3. The method of claim 2, wherein the method further comprises a reduction in at least one of Western Ontario and McMaster Universities Osteoarthritis Index B stiffness score, Western Ontario and McMaster Universities Osteoarthritis Index C disability score, Patient Global Assessment of disease activity by visual analog scale, weekly average of daily global pain score by visual analog scale, weekly average of daily joint pain score by visual analog scale, cumulative amount of rescue medication used for pain relief, and urinary C-terminal crosslinking telopeptide of collagen Type II level, compared to baseline or untreated control.

4. The method of claim 1, wherein the liposomal composition is administered once in every four months, six months or 26 weeks.

5. The method of claim 1, wherein the subject has baseline Western Ontario and McMaster Universities Osteoarthritis Index A pain score ≥2 and a Western Ontario and McMaster Universities Osteoarthritis Index A pain score reduction of at least 1 point.

6. The method of claim 3, wherein the subject has baseline weekly average of daily joint pain score by visual analog scale ≥50 mm and a weekly average of daily joint pain score by visual analog scale reduction of at least 5, 10, 15, or 20.

7. The method of claim 6, wherein the subject has baseline weekly average of daily joint pain score by visual analog scale in the range of from 50 mm to 90 mm.

8. The method of claim 1, wherein the phosphatidylcholine concentration is about 50 mM to about 300 mM.

9. A method of treating a subject having an articular disorder, the method comprising administration of a single intra-articular injection of a liposomal composition comprising a combination of 1,2-dimyristoyl-sn-glycero-3-phosphocholine and 1,2-dipalmitoyl-sn-glycero-3-phosphocholine as the sole active ingredients, with the composition administered every 4 to 12 months, wherein the method comprises a reduction in Western Ontario and McMaster Universities Osteoarthritis Index A pain score of at least 50% compared to a baseline or untreated control.

10. The method of claim 9, wherein the liposomal composition comprises 1,2-dimyristoyl-sn-glycero-3-phosphocholine and 1,2-dipalmitoyl-sn-glycero-3-phosphocholine in a mole ratio of 40:60 to 50:50; or wherein the liposomal composition comprises 1,2-dimyristoyl-sn-glycero-3-phosphocholine in a weight percent ranging from about 1% to about 10% and 1,2-dipalmitoyl-sn-glycero-3-phosphocholine in a weight percent ranging from about 2% to about 12%; or wherein the liposomal composition comprises about 20 mg to about 700 mg of 1,2-dimyristoyl-sn-glycero-3-phosphocholine and about 30 mg to about 900 mg of 1,2-dipalmitoyl-sn-glycero-3-phosphocholine.

11. The method of claim 1, wherein the liposomal composition is administered at a volume of between about 0.5 ml and about 10 ml; or wherein the liposomal composition is administered at a volume of between about 1 ml and about 6 ml; or wherein the liposomal composition is administered at a volume of about 3 ml.

12. The method of claim 1, wherein the liposomal composition comprises a plurality of liposomes selected from the group consisting of small unilamellar vesicles, large unilamellar vesicles, giant unilamellar vesicles, oligolamellar vesicles, multilamellar vesicles, multivesicular liposomes, and a mixture or combination thereof.

13. The method of claim 12, wherein the plurality of liposomes are multilamellar vesicles; and/or wherein the liposomes have sizes ranging from about 0.5 μm to about 10 μm.

14. The method of claim 12, wherein the liposomal composition comprises a fluid medium comprising water or a buffer; and/or wherein the liposomal composition has a pH in the range of about 5 to about 8.

15. The method of claim 14, wherein the fluid medium comprises a histidine buffer.

16. The method of claim 15, wherein the fluid medium further comprises a tonicity agent selected from a low molecular weight polyol and a sugar alcohol.

17. The method of claim 16, wherein the polyol is selected from the group consisting of mannitol, sorbitol, glycerol, lactitol, maltitol, dextrose, lactose, trehalose, and combinations thereof; and/or wherein the weight ratio between the plurality of liposomes and the polyol ranges from about 6:1 to about 2:1.

18. The method of claim 1, wherein the articular disorder is osteoarthritis.

19. The method of claim 11, wherein the liposomal composition is administered at a volume of about 3 ml.

20. The method of claim 9, wherein the liposomal composition is administered at a volume of about 3 ml.

21. The method of claim 9, wherein the liposomal composition comprises a fluid medium comprising a histidine buffer and a tonicity agent selected from a low molecular weight polyol and a sugar alcohol; wherein the liposomal composition has a pH in the range of about 5 to about 8.

* * * * *